United States Patent
Hartsell, Jr.

(10) Patent No.: US 6,381,514 B1
(45) Date of Patent: Apr. 30, 2002

(54) DISPENSER SYSTEM FOR PREVENTING UNAUTHORIZED FUELING

(75) Inventor: Hal C. Hartsell, Jr., Kernersville, NC (US)

(73) Assignee: Marconi Commerce Systems Inc., Greensboro, NC (US)

(*) Notice: Subject to any disclaimer, the term of this patent is extended or adjusted under 35 U.S.C. 154(b) by 0 days.

(21) Appl. No.: 09/140,293

(22) Filed: Aug. 25, 1998

(51) Int. Cl.⁷ .............................................. G06F 17/00
(52) U.S. Cl. .......................... 700/236; 700/241; 700/244
(58) Field of Search ................................. 700/231, 236, 700/241, 244, 282, 283; 141/94, 95

(56) References Cited

U.S. PATENT DOCUMENTS

| | | | |
|---|---|---|---|
| 3,536,109 A | 10/1970 | Ginsburgh et al. | 141/98 |
| 3,622,924 A | 11/1971 | Crandall et al. | 222/64 |
| 3,629,858 A | 12/1971 | Hayakawa et al. | 340/172.5 |
| 3,642,036 A | 2/1972 | Ginsburgh et al. | 141/94 |
| 3,650,303 A | 3/1972 | Chambers et al. | 141/1 |
| 3,786,421 A | 1/1974 | Wostl et al. | 340/149 |
| 3,814,148 A | 6/1974 | Wostl | 141/98 |
| 4,072,929 A | 2/1978 | Garmong | 340/147 |
| 4,263,945 A | 4/1981 | Van Ness | 141/98 |
| 4,290,538 A * | 9/1981 | White | 222/25 |
| 4,313,168 A | 1/1982 | Stephens et al. | 364/465 |
| 4,345,146 A | 8/1982 | Story et al. | 235/381 |
| 4,347,472 A | 8/1982 | Lemelson | 320/2 |
| 4,469,149 A | 9/1984 | Walkey et al. | 141/94 |
| 4,490,798 A | 12/1984 | Franks et al. | 365/559 |
| 4,532,511 A | 7/1985 | Lemelson | 340/933 |
| 4,600,829 A | 7/1986 | Walton | 236/439 |
| 4,711,994 A | 12/1987 | Greenberg | 235/384 |
| 4,714,925 A | 12/1987 | Bartlett | 340/825.55 |
| 4,728,955 A | 3/1988 | Hane | 343/140 |
| 4,760,533 A | 7/1988 | Bydlon | 365/465 |
| 4,804,937 A | 2/1989 | Barbiaux et al. | 340/52 |
| 4,846,233 A | 7/1989 | Fockens | 141/94 |
| 4,881,581 A | 11/1989 | Hollerback | 141/113 |
| 4,887,578 A | 12/1989 | Woodcock et al. | 23/519 |
| 4,897,642 A | 1/1990 | DiLullo et al. | 340/825 |
| 4,934,419 A | 6/1990 | Lamont et al. | 141/94 |
| 4,967,366 A | 10/1990 | Kaehler | 365/479 |
| 5,003,472 A | 3/1991 | Perrill et al. | 365/401 |
| 5,025,253 A | 6/1991 | DiLullo et al. | 340/825.06 |

(List continued on next page.)

FOREIGN PATENT DOCUMENTS

| | | | |
|---|---|---|---|
| EP | 0 456 425 A1 | 5/1991 | B67D/5/33 |
| EP | 0 736 484 A2 | 10/1996 | B67D/5/04 |
| GB | 2 222 714 A | 3/1990 | |

(List continued on next page.)

OTHER PUBLICATIONS

CARB—Estimated Hyudrcarbon Emissions of Phase II and Onboard Vapor Recovery Systems; Apr. 13, 1994.

(List continued on next page.)

Primary Examiner—Christopher P. Ellis
Assistant Examiner—Michael E. Butler
(74) Attorney, Agent, or Firm—Withrow & Terranova PLLC

(57) ABSTRACT

A fuel dispensing system and method for preventing unauthorized fueling by controlling access and delivery of fuel from a fuel dispenser, based on information received from a vehicle or container via remote communications during a fueling operation. The vehicle transmits a signal including fuel delivery indicia to the dispenser. The dispenser uses the fuel delivery indicia to determine whether the vehicle is receiving fuel and determines whether it is delivering fuel. The dispenser maintains fuel delivery authorization if the vehicle indicates that it is receiving fuel and the dispenser is delivering fuel. If the vehicle indicates that it is not receiving fuel and the dispenser determines that it is delivering fuel, the dispenser may generate an output signal to identify an improper fueling condition and stop fuel delivery.

17 Claims, 17 Drawing Sheets

U.S. PATENT DOCUMENTS

| | | | |
|---|---|---|---|
| 5,040,577 A | * 8/1991 | Pope | 141/59 |
| 5,058,044 A | 10/1991 | Stewart et al. | 364/551.01 |
| 5,070,328 A | 12/1991 | Fockens | 340/825.54 |
| 5,072,380 A | 12/1991 | Randleman et al. | 364/406 |
| 5,086,389 A | 2/1992 | Hassett et al. | 365/401 |
| 5,128,862 A | 7/1992 | Mueller | 364/405 |
| 5,131,441 A | 7/1992 | Simpson et al. | 141/209 |
| 5,156,198 A | * 10/1992 | Hall | 141/94 |
| 5,156,199 A | * 10/1992 | Hartsell, Jr. et al. | 141/83 |
| 5,157,319 A | 10/1992 | Klontz | 320/2 |
| 5,184,309 A | 2/1993 | Simpson et al. | 364/510 |
| 5,202,617 A | 4/1993 | Nor | 320/2 |
| 5,204,512 A | 4/1993 | Ieki et al. | 235/382 |
| 5,204,819 A | 4/1993 | Ryan | 364/465 |
| 5,217,051 A | 6/1993 | Simpson et al. | 141/59 |
| 5,218,527 A | 6/1993 | Ishikawa et al. | 364/405 |
| 5,238,034 A | 8/1993 | Corfitsen | 141/94 |
| 5,249,612 A | 10/1993 | Parks et al. | 141/219 |
| 5,249,707 A | 10/1993 | Simpson et al. | 222/40 |
| 5,253,162 A | 10/1993 | Hassett et al. | 364/405 |
| 5,267,592 A | 12/1993 | Kaplan et al. | 141/387 |
| 5,319,545 A | 6/1994 | McGarvey et al. | 364/403 |
| 5,327,066 A | 7/1994 | Smith | 320/2 |
| 5,327,945 A | 7/1994 | Simpson et al. | 141/59 |
| 5,343,906 A | * 9/1994 | Tibbals, III | 141/83 |
| 5,351,187 A | 9/1994 | Hassett | 364/401 |
| 5,359,522 A | 10/1994 | Ryan | 365/465 |
| 5,360,139 A | 11/1994 | Goode | 222/40 |
| 5,361,216 A | 11/1994 | Warn et al. | 364/510 |
| 5,363,889 A | 11/1994 | Simpson et al. | 141/208 |
| 5,365,984 A | 11/1994 | Simpson et al. | 141/387 |
| 5,383,500 A | 1/1995 | Dwars et al. | 141/98 |
| 5,392,049 A | 2/1995 | Gunnarsson | 342/42 |
| 5,393,195 A | 2/1995 | Corfitsen | 414/749 |
| 5,394,393 A | * 2/1995 | Brisson et al. | 370/60 |
| 5,400,253 A | 3/1995 | O'Connor | 364/422 |
| 5,414,427 A | 5/1995 | Gunarsson | 342/51 |
| 5,422,624 A | 6/1995 | Smith | 340/438 |
| 5,444,742 A | 8/1995 | Grabow et al. | 375/267 |
| 5,485,520 A | 1/1996 | Chaum et al. | 380/24 |
| 5,495,250 A | 2/1996 | Ghaem et al. | 342/51 |
| 5,499,181 A | 3/1996 | Smith | 365/424 |
| 5,505,234 A | 4/1996 | Simpson et al. | 141/206 |
| 5,541,835 A | 7/1996 | Dextraze et al. | 364/401 |
| 5,552,789 A | 9/1996 | Schuermann | 342/42 |
| 5,557,268 A | 9/1996 | Hughes et al. | 340/933 |
| 5,557,965 A | 9/1996 | Fiechtner | 73/49.2 |
| 5,562,133 A | 10/1996 | Mitchell | 141/206 |
| 5,564,608 A | 10/1996 | Cooper | 222/470 |
| 5,596,501 A | 1/1997 | Comer et al. | 365/464 |
| 5,601,413 A | * 2/1997 | Langley et al. | 417/12 |
| 5,602,745 A | * 2/1997 | Atchley et al. | 364/464.23 |
| 5,605,182 A | * 2/1997 | Oberrecht et al. | 141/94 |
| 5,609,190 A | 3/1997 | Anderson et al. | 141/59 |
| 5,621,411 A | 4/1997 | Hagl et al. | 342/42 |
| 5,621,412 A | 4/1997 | Sharpe et al. | 342/51 |
| 5,628,351 A | 5/1997 | Ramsey, Jr. et al. | 141/98 |
| 5,671,785 A | * 9/1997 | Anderson | 141/59 |
| 5,671,786 A | 9/1997 | Corfitsen | 141/94 |
| 5,673,736 A | 10/1997 | Farkas | 141/198 |
| 5,700,999 A | 12/1997 | Streicher et al. | 235/381 |
| 5,717,374 A | 2/1998 | Smith | 340/438 |
| 5,722,469 A | 3/1998 | Tuminaro | 141/94 |
| 5,727,608 A | 3/1998 | Nusbaumer et al. | 141/94 |
| 5,842,188 A | * 11/1998 | Ramsey et al. | 705/416 |
| 5,902,985 A | 5/1999 | Bos et al. | 235/384 |
| 5,923,572 A | * 7/1999 | Pollock | 364/528.17 |
| 6,024,142 A | * 2/2000 | Bates | 141/194 |
| 6,070,156 A | * 5/2000 | Hartsell, Jr. | 705/412 |
| 6,078,850 A | * 6/2000 | Kane et al. | 701/29 |
| 6,085,805 A | * 7/2000 | Bates | 141/94 |
| 6,128,551 A | 10/2000 | Davis et al. | 700/236 |
| 6,182,714 B1 | * 2/2001 | Ginnsburgh et al. | 141/63 |

FOREIGN PATENT DOCUMENTS

| | | |
|---|---|---|
| JP | 04128186 | 4/1992 |
| JP | 6227597 | 8/1994 |
| WO | WO 94/05592 | 3/1994 |
| WO | WO 94/06031 | 3/1994 |
| WO | WO 9514612 | 6/1995 |
| WO | WO 95/32919 | 12/1995 |
| WO | WO 96/28791 | 9/1996 |
| WO | WO 9639351 | 12/1996 |
| WO | WO 97/24689 | 7/1997 |
| ZA | 944327 | 6/1994 |

OTHER PUBLICATIONS

CARB—Staffs Proposesd Recommendation For The Adoption Of The United States Environmental Protection Agency's Vehicle Refueling Standard and Test Procedures; Apr. 27, 1994.

Micron Communications, Inc.—Meeting Notice dated Feb. 4, 1997.

SAE Meeting Notice; May 27, 1997.

SAE ORVR Task Force Meeting Agenda; May 29, 1997.

* cited by examiner

DISPENSER SYSTEM FOR PREVENTING UNAUTHORIZED FUELING

BACKGROUND OF THE INVENTION

The present invention relates generally to fuel dispensers and, more particularly, to a fuel dispenser for preventing unauthorized fueling by controlling delivery of fuel to a vehicle or fuel container, based on information received from the vehicle or fuel container during a fueling operation.

There is a need to prevent consumers from improperly fueling at service stations by filling unauthorized receptacles or using improper types of fuel, such as M-85, which is a highly combustible fuel. The California Energy Commission has proposed a system to prevent filling containers with M-85. The system is believed to provide a nozzle antenna adapted to communicate with a transponder mounted in close proximity to the vehicle filler pipe. Fueling cannot take place unless the nozzle antenna is continuously receiving a signal that the vehicle is authorized to receive the type of fuel being dispensed, thus restricting delivery of fuel to only authorized vehicles. This system is costly and unreliable because the nozzle antenna communicates the information to the fuel dispenser via a wired path through the nozzle, hose, breakaway hardware, and outlet casting, rather than through a form of remote communication. There is no known method for preventing delivery to unauthorized vehicles or containers which is reliable and cost-effective.

Thus, there remains a need for a fuel dispensing system providing a more efficient and reliable way to prevent unauthorized fueling and/or restrict access to certain types of fuel to only authorized vehicles and containers.

SUMMARY OF THE INVENTION

The present invention is directed to a fuel dispenser capable of preventing unauthorized fueling, by precisely controlling access and delivery of fuel based on information received from a vehicle while it is being fueled. The fuel dispensing system provides for a dispenser, having a receiver capable of receiving fuel delivery indicia transmitted from the vehicle, preferably on a continuous basis. During delivery, the dispenser determines whether it is dispensing fuel, and whether the vehicle is receiving fuel based on the fuel delivery indicia. In order to maintain fuel delivery authorization, the dispenser must determine that it is actually dispensing fuel, and the vehicle must indicate that it is actually receiving fuel based on the fuel delivery indicia. When both conditions are met, there is a strong indication that the dispenser is delivering fuel to an authorized vehicle.

The fuel delivery indicia generally includes information indicative of fuel being received by the vehicle or the type of fuel being received. Information indicative of fueling may include volume, ullage, or delivery rate information, or simply indicate fuel is being received regardless of rate. Any information informing the dispenser, or providing the dispenser sufficient information to determine that fuel is being received, is acceptable. The information may also be or include the type of fuel being received.

The fuel delivery indicia may also include information relating to vehicle type, vehicle identity, diagnostics, on-board vapor recovery capability, fuel tank type, fuel tank volume, volume of fuel in the fuel tank, ullage, maximum allowed fueling rate, maximum fueling rate as a function of ullage, whether the vehicle is receiving fuel, whether the vehicle is receiving the proper type of fuel, quality and octane readings, actual rate of receipt of fuel, quantity of fuel received, or change in volume of fuel received, among others. The information transferred will depend on the system and desired control ability.

In operation, the dispenser may determine the type of fuel the vehicle is authorized to receive based on the received fuel delivery indicia. If the dispenser is equipped to deliver that type of fuel, the dispenser authorizes fuel delivery and the customer begins fueling. If the dispenser is not equipped to deliver the proper type of fuel for the vehicle, the dispenser generates an output signal to identify an improper fueling condition. The output signal may be configured to prevent fuel delivery or notify the customer, vehicle, and/or station operator. The vehicle may periodically or continuously transmit fuel delivery indicia to the dispenser while the customer is fueling the vehicle, independently or in response to interrogation signals from the dispenser.

The dispenser may stop fuel delivery if it determines that it is dispensing fuel, and the vehicle indicates that it is not receiving fuel. This is an indication that the dispenser is fueling an unauthorized container or vehicle. Further, when the dispenser determines that it is not dispensing fuel, and the vehicle indicates in the fuel delivery indicia that it is receiving fuel, fuel delivery authorization is not maintained and the fuel dispenser may stop fuel delivery. This is an indication that the vehicle is receiving fuel from a source other than the dispenser that was authorized to deliver fuel to the vehicle. In both of these cases, the fuel dispenser may generate an output signal to identify an improper fueling condition. The signal may be configured to stop fuel delivery and/or notify the customer, vehicle, and/or station operator.

In addition, the fuel dispenser may have the ability to stop fuel delivery if the vehicle is receiving the wrong type of fuel. When so configured, the fuel dispenser determines whether it is delivering the proper type of fuel for the vehicle by monitoring the type of fuel the vehicle is receiving based on the fuel delivery indicia transmitted from the vehicle. If the dispenser is not delivering the proper type of fuel and the vehicle is not receiving the proper type of fuel, the dispenser may stop fuel delivery authorization and prevent the dispenser from delivering fuel. The dispenser may then generate an output signal to identify an improper fueling condition.

In a further alternative embodiment of the present invention, the fuel dispenser is capable of controlling access and delivery of fuel to a fuel container, such as the kind used to store fuel for lawnmowers, etc. The fuel dispenser communicates with the fuel container the same way that it would communicate with a vehicle as described above. The fuel container is preferably configured to provide a signal including fuel delivery indicia to a fuel dispenser. The fuel dispenser receives the signal from the fuel container and determines whether the container is receiving fuel based on the fuel delivery indicia. In order to maintain fuel delivery authorization, the dispenser must determine that it is actually dispensing fuel, and the vehicle must indicate that it is actually receiving fuel.

These and other aspects of the present invention will become apparent to those skilled in the art after a reading of the following description of the preferred embodiment when considered with the drawings.

DETAILED DESCRIPTION OF THE DRAWINGS

Figure 1:
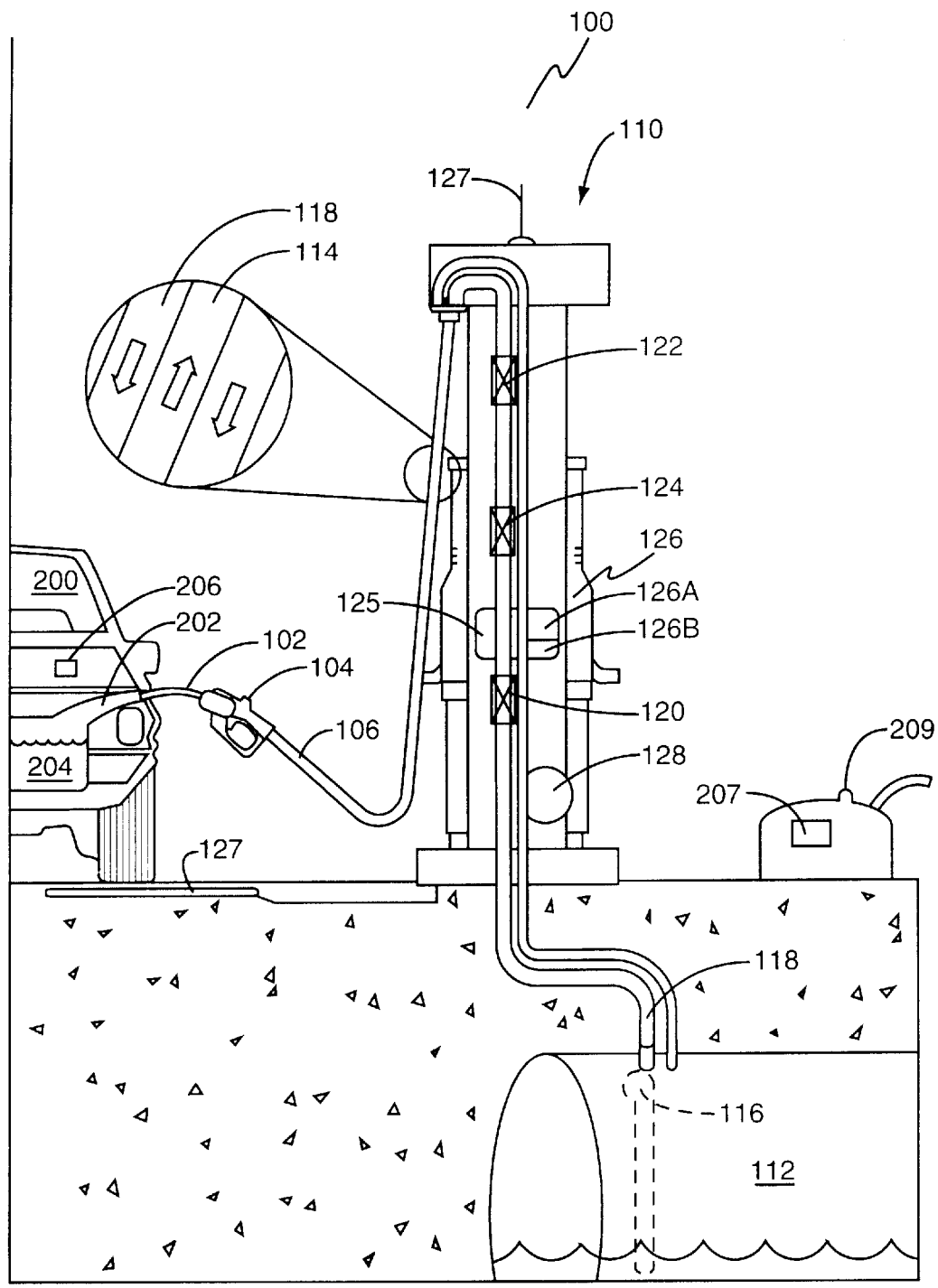
FIG. 1 is an elevational and partial sectional view of a fuel dispensing system according to the present invention.

In the following description, like reference characters designate like or corresponding parts throughout the several figures. It should be understood that the illustrations are for the purpose of describing preferred embodiments of the invention and are not intended to limit the invention thereto.

Given the nature of the present application, an overview of the necessary hardware for the various areas in the fueling environment will be discussed, followed by a description of the various functional aspects of the system and how a vehicle or container communicates with the fuel dispensing system.

As shown in FIG. 1, in a typical service station, an automobile 200, is shown being fueled from a gasoline dispenser 110. A spout 102 of nozzle 104 is shown inserted into a filler pipe 202 of a fuel tank 204 during the refueling of the automobile 200. A fuel delivery hose 106 having vapor recovery capability is connected at one end to the nozzle 104, and at its other end to the fuel dispenser 110. The nozzle 104 provides manual control of fuel delivery to the vehicle 200. As shown by the cutaway view of the interior of the fuel delivery hose 106, a fuel delivery passageway 118 is formed within the fuel delivery hose 106 for distributing gasoline pumped from an underground storage tank 112 to the nozzle 104. Gasoline is typically pumped by a delivery pump system 116 located within the tank 112.

The fuel delivery passageway 118 is typically annular within the delivery hose 106 and tubular from within the fuel dispenser 110 to the tank 112. The fuel delivery hose 106 typically includes a tubular vapor recovery passageway 114 for transferring fuel vapors expelled from the vehicle's fuel tank 204 to the underground storage tank 112 during the refueling of the vehicle 200.

A vapor recovery pump 128 provides a vacuum in the vapor recovery passageway 114 for removing fuel vapor during a refueling operation. The vapor recovery system using the pump 128 may be any suitable system such as those shown in U.S. Pat. No. 5,040,577 to Pope, U.S. Pat. No. 5,195,564 to Spalding, U.S. Pat. No. 5,333,655 to Bergamini et al., or U.S. Pat. No. 3,016,928 to Brandt. The invention is equally useful on dispensers that are not vapor recovery dispensers.

The fuel delivery passageway 118 typically includes control valve 122, a positive displacement meter 124 and fuel filter 120. The fuel dispenser 110 also includes a dispenser control system 126 operatively associated with the control valve 122, flow meter 124, and the fuel pump 116. In the preferred embodiment, the control valve 122 acts as a flow modulator, and the flow meter 124 acts as a fuel flow transducer. The dispenser control system 126 has one or more controllers 126A and associated memory 126B, and it may receive volume data from the flow meter 124 through cabling, as well as provide control of fuel delivery. The control system 126 may also provide audible signals to an audio module and loud speaker 146 (of FIG. 2) in order to provide various beeps, tones, and audible messages to a customer. The messages may include warnings, instructions, and advertising.

Figure 2:
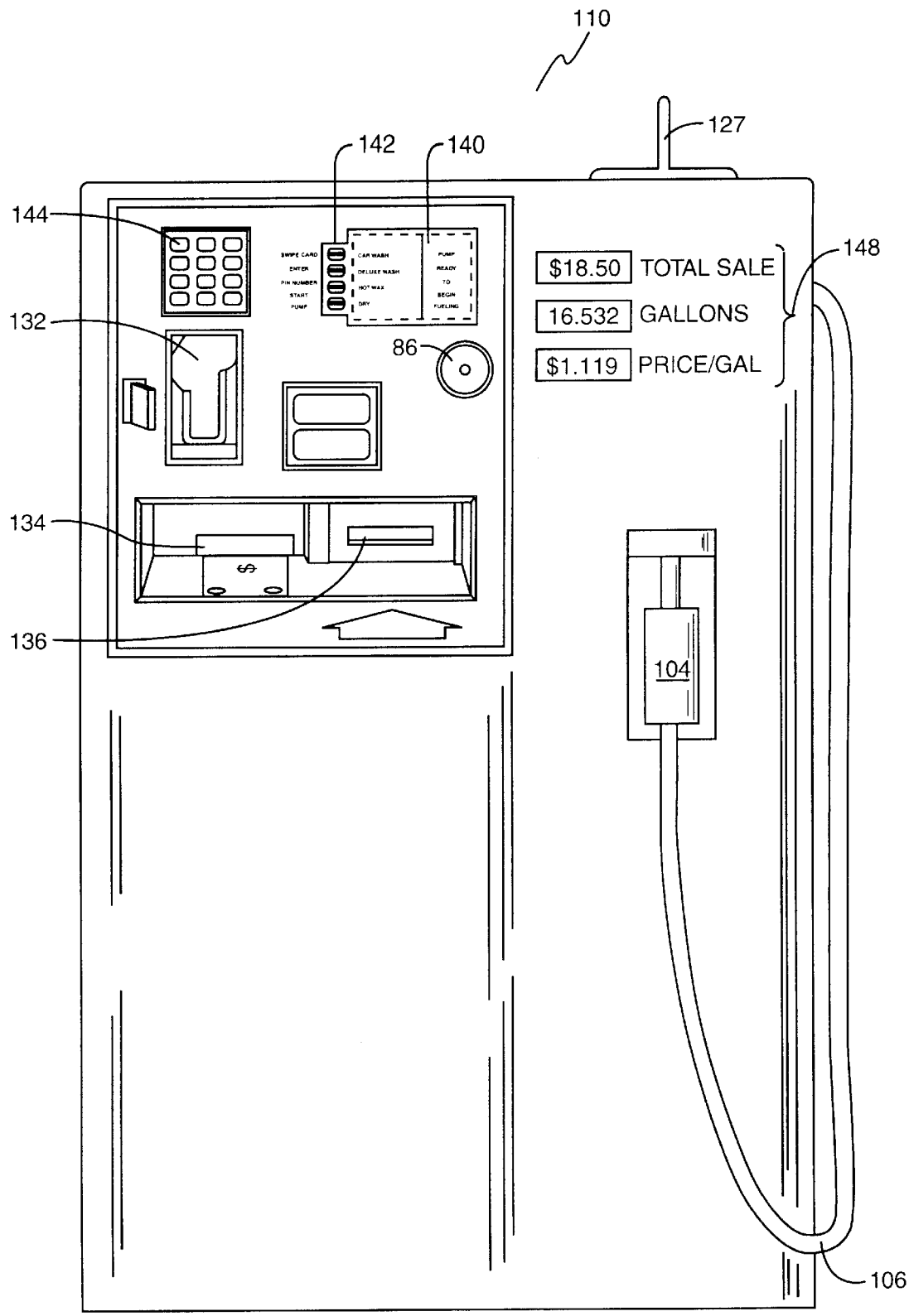
FIG. 2 depicts a fuel dispenser of the fuel dispensing system according to the present invention.

Referring now to FIG. 2, the fuel dispenser 110 is preferably equipped with a payment acceptor, such as a card reader 132 or cash acceptor 134. With these options, the dispenser control system 126 may read data from the magnetic strip of a card inserted in the card reader 132 or receive cash from the customer and communicate such information to a central control system 300 (of FIG. 4A), such as the G-site controller sold by Gilbarco Inc., 7300 West Friendly Avenue, Greensboro, N.C. The central control system 126 typically communicates with a remote network, such as card verification authority, to ascertain whether a transaction proposed to be charged or debited from an account associated with the card inserted in the card reader 132 is authorized.

The dispenser 110 may also include one or more types of alphanumeric displays 148 together with high-resolution graphics display 140. The graphics display 140 will generally have an associated keypad 142 adjacent to the display or integrated with the display to provide a touch interface. The dispenser may include an additional, auxiliary keypad 144 associated with the card reader 132 for entering secret codes or personal identification numbers (PIN's). Notably, the displays 148, 140, and keypads 142, 144 may be integrated into a single device and/or touch interface. The dispenser control system 126 is preferably comparable to the microprocessor-based control systems used in CRIND (card reader in dispenser) and TRIND (tag or transponder reader in dispenser) type units sold by Gilbarco Inc. under the trademark THE ADVANTAGE.

Figure 3A:
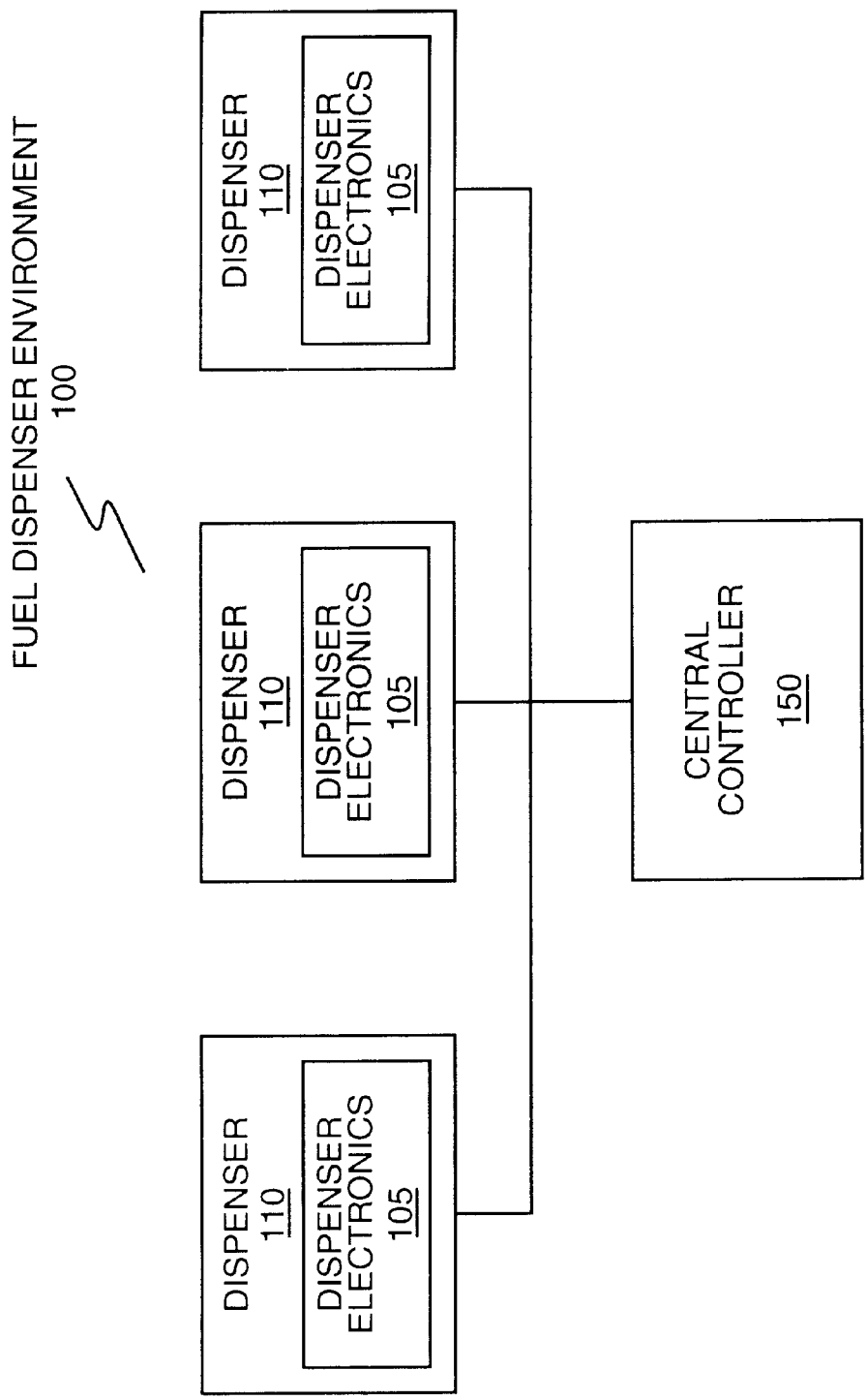
FIG. 3A depicts a block diagram of a fueling environment constructed according to the present invention.
Figure 3B:
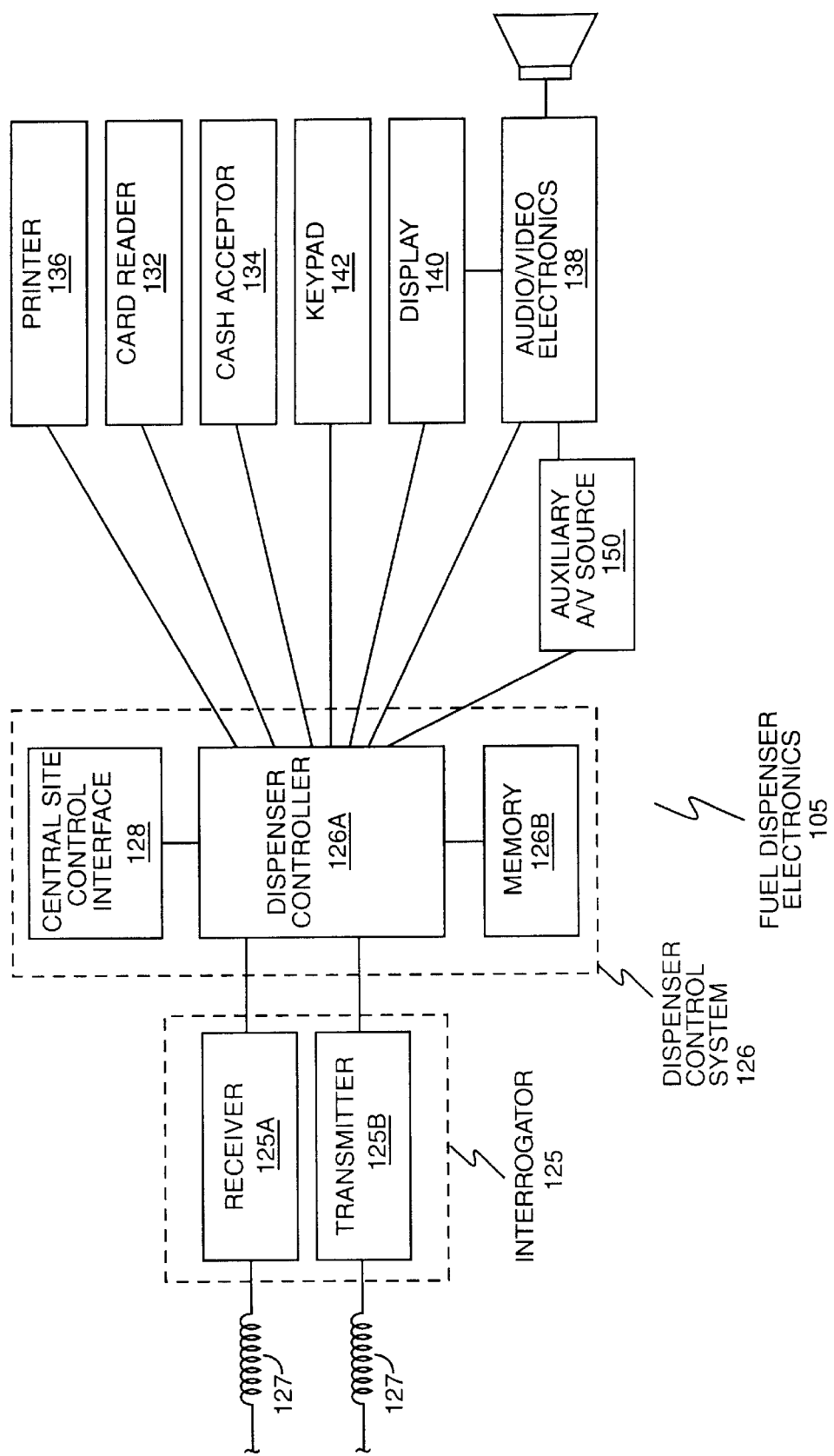
FIG. 3B depicts a block diagram of the fuel dispenser electronics of each fuel dispenser shown in FIG. 3A.

FIG. 3A shows a basic overview of a fuel dispenser environment 100 having several fuel dispensers 110 that communicate with a central control system 150. FIG. 3B shows a diagram of the dispenser electronics 105 of each dispenser 110 of the fueling environment 100. Each dispenser 110 has a control system 126 that includes a controller 126A and associated memory 126B, which interfaces with the control central control system 150 through an interface 128. Each dispenser control system 126 preferably provides a graphical user interface with keypad 142 and display 140. Audio/visual electronics 138 is adapted to interface with the dispenser control system 126 and/or and auxiliary audio/video source 150 to provide advertising, merchandising and multimedia presentations to a customer in addition to basic transaction functions. The graphical user interface provided by the dispenser allows customers to purchase goods and services other than fuel at the dispenser. For example, the customer may purchase a car wash and/or food from the fuel station store, convenience store, or quick-serve restaurant while fueling the vehicle. Preferably, the customer is provided a video menu at the display 100 to facilitate selection of the various services, goods, and food available for purchase. The card reader 132 and cash acceptor 134 allow the customer to pay for any of the services, goods, or food ordered at the dispenser while the printer 136 will provide a written record of the transaction. The dispenser control system 126 communicates with the central control system 150 that may be located in a backroom.

The present invention particularly relates to a fuel dispensing system for preventing unauthorized fueling of a vehicle 200, based on information received from remote communications between a fuel dispenser 110 and the vehicle 200 during a fueling operation. It should be noted, however, that the fuel dispensing system of the present invention may also be configured to prevent unauthorized fueling of a fuel container 209 (of FIG. 1) such as those used to store fuel for lawnmowers, etc. The dispenser 110 is preferably configured to remotely communicate with a fuel container 209 in the same way that it remotely communicates with a vehicle 200.

As shown in FIG. 3B, the fueling environment 100 is equipped with communication electronics capable of providing uni- or bi- directional communications with a vehicle 200 or fuel container 209 carrying a remote communications device 206, 207. For the sake of conciseness and readability, the communication electronics of the fueling environment 100 will be called an "interrogator". An interrogator 125 will generally include a transmitter 125A and receiver 125B, associated with one or more antennas 127, capable of communicating with the remote communications device 206, 207 (of FIG. 1) carried by the vehicle 200 or fuel container 209. Please note that an interrogator 125, as defined herein, need not contain both a receiver and a transmitter for various aspects of the invention.

The remote communications device 206, 207 carried by the vehicle 200 or fuel container 209 may include a transmitter and a receiver that separately transmits and separately receives signals in cooperation with an associated control system. Further, the transmitter and receiver of the remote communications device may be configured so that the transmitter actually operates on and modifies a signal received from the communication electronics in the fueling environment 100, such as that normally associated with traditional transponder communication systems. In addition, the remote communications device may be adapted to either simply send out a signal containing fuel delivery indicia, or carry out high-level communications and have the ability to process, store and retrieve information. Various features of the invention will be disclosed in greater detail below.

Referring again to FIG. 1, the dispenser control system 126 may include or be associated with an interrogator 125 (of FIG. 1), for providing remote communications between the vehicle 200 and the dispenser 110. Although this specification focuses on bidirectional communication between the vehicle 200 and the dispenser 110, it may be preferable in certain embodiments to send information only in one direction, from the vehicle 200 to the dispenser 110. Thus, for unidirectional communications, only transmitters in the vehicle 200 and receivers in the dispenser 110 are necessary. One advantage of bi-directional communication is that the fuel dispenser 110 may transmit various types of information to the vehicle 200. This information may include warnings of improper fueling conditions, information on the amount of sale, amount of fuel being dispensed, billing data or requests for a variety of information.

As noted above, the remote communication electronics 206, 207 may include traditional transponder-type electronics. For example, the transponders may incorporate Texas Instruments RFID technology as well as the Micron Microstamp™ produced by Micron Communications, Inc., 8000 South Federal Way, Boise, Id. 83707-0006.

Attention is drawn to U.S. Pat. Nos. 5,621,913; 5,608,739; 5,583,850; 5,572,226; 5,558,679; 5,557,780; 5,552,743; 5,539,775; 5,550,650; 5,497,140; 5,479,416; 5,448,110; 5,365,551; 5,325,150; and 5,302,329 owned by Micron Technology, Inc. the disclosures of which are incorporated herein by reference.

Figure 4A:
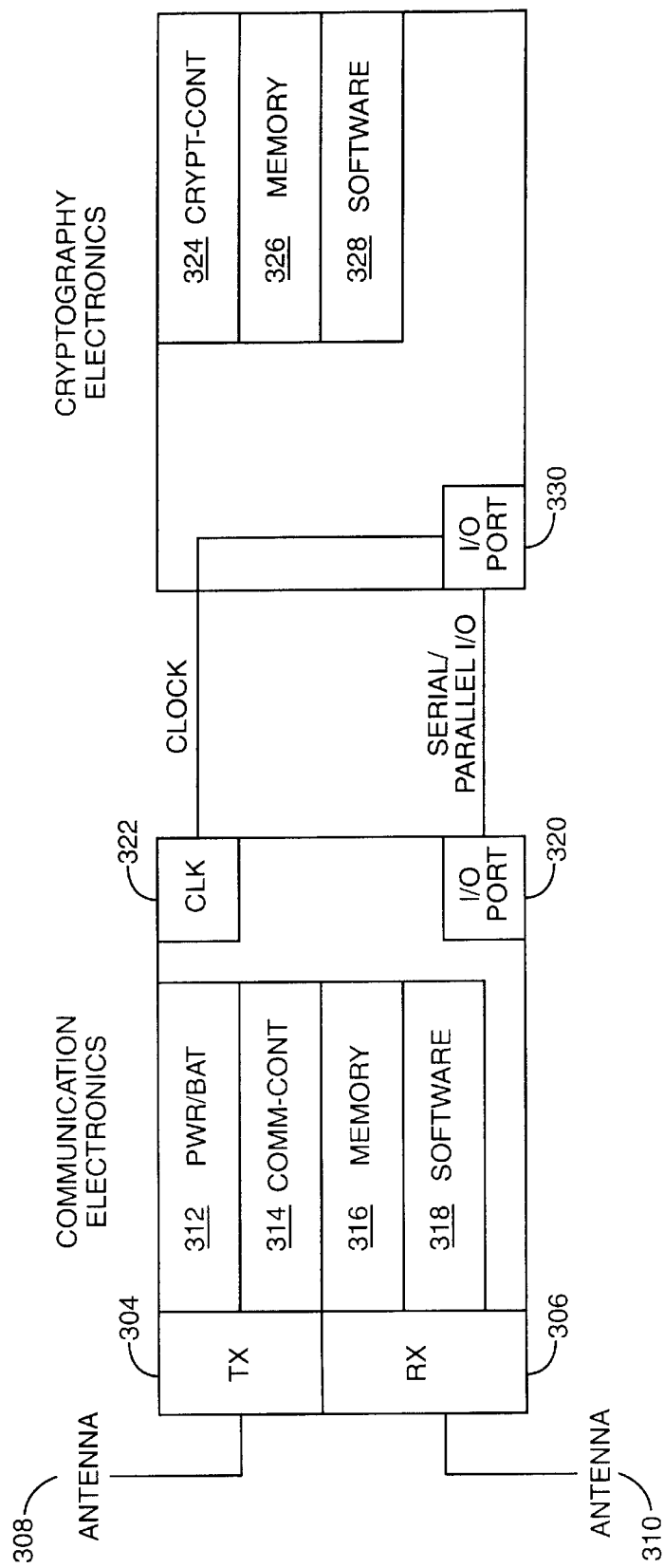
FIG. 4A depicts a block diagram of a first transponder constructed according to the present invention.

Turning now to FIG. 4A, the preferred embodiment of a transponder is shown. Transponder communication electronics 206, 207 adapted to provide remote communications with the dispenser interrogator 125 (of FIG. 1), include a transmitter 304 and receiver 306 having associated antennas 308, 310. The transmitter 304 and receiver 306 operate to transmit and receive data to and from the interrogator 125. The communication electronics 206, 207 may include a battery power supply 312, a communication controller 314 associated with a memory 316, having software 318 necessary to operate the communication electronics 206, 207 and optional cryptography electronics 302.

Serial communications between the communication electronics 206, 207 and cryptography electronics 302 is provided via the input/output (I/O) ports 320, 330 associated with the respective electronics. The communication electronics 206, 207 provide a signal from a clock 322 to the I/O port 330 of the cryptography electronics 302. The cryptography electronics 302 include a controller 324, memory 326 and software 328 necessary to encrypt and decrypt data, as well as provide any additional operations. The memory 316, 326 may include random access memory (RAM), read only memory (ROM), or a combination thereof. Notably, the communication controller 314 and the cryptography controller 324 may be integrated into one controller. Similarly, the software and memory of the communication and cryptography modules may be integrated or embodied in hardware.

Figure 4B:
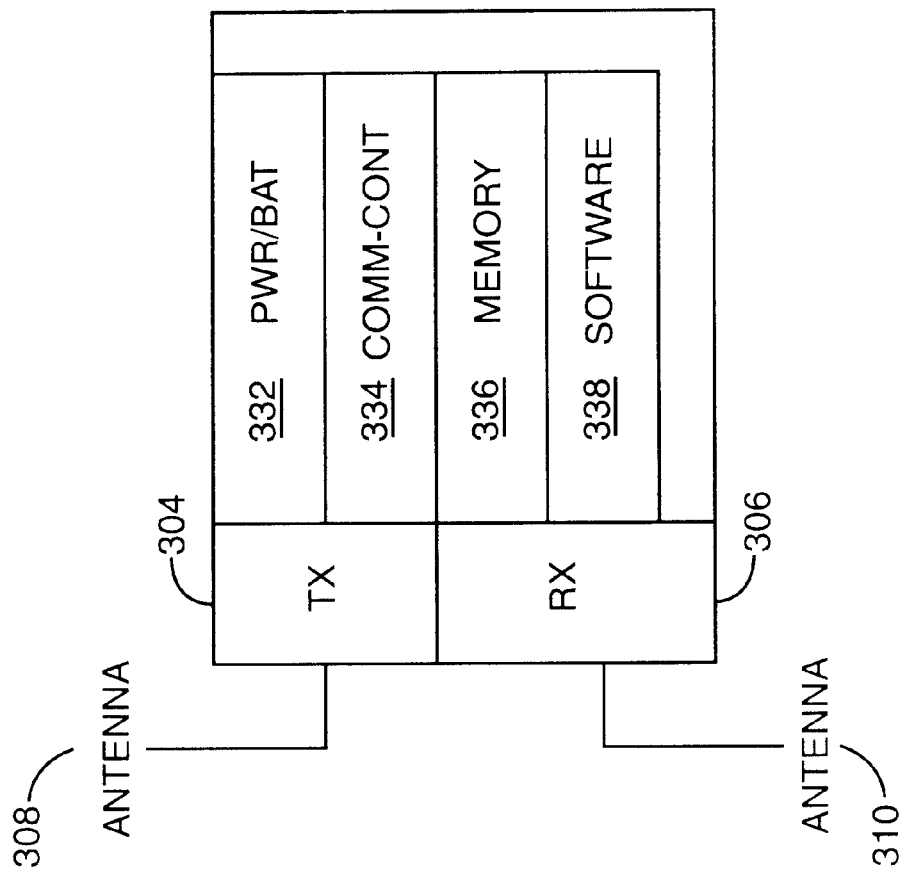
FIG. 4B depicts a block diagram of a second transponder constructed according to the present invention.

As shown in FIG. 4B, the communication and cryptography electronics, as well as any associated controllers, may be integrated into a single controller system and/or integrated circuit. In such cases, a single controller 334 is associated with a battery power supply 332, and memory 336 having software 338 as necessary for operation. In such an integrated system, the controller 334 will carry out any cryptography functions as well as any other functions necessary for operation.

In one embodiment, the communications controller 314, 334 specifically provides a spread-spectrum processor associated with an 8-bit microcontroller. The memory 316, 336 includes 256 bytes of RAM. The receiver 306 operates in conjunction with the spread-spectrum processor and is capable of receiving direct sequence, spread-spectrum signals having a center frequency of 2.44175 GHz. The transmitter 304 is preferably a DPSK modulated back-scatter transmitter transmitting differential phase shift key (DPSK) modulated back scatter at 2.44175 GHz with a 596 KHz sub-carrier. The various interrogators 125 in the fueling environment 100 are adapted to receive and transmit the signals to properly communicate with the transponders.

For additional information on a transponder/interrogator system providing for highly secure transactions between a transponder and a host authorization system through a dispenser, attention is drawn to application Ser. No. 08/895,417 filed Jul. 16, 1997, entitled CRYPTOGRAPHY SECURITY FOR REMOTE DISPENSER TRANSACTIONS in the name of William S. Johnson, Jr.; application Ser. No.

08/895,282 filed Jul. 16, 1997, entitled MEMORY AND PASSWORD ORGANIZATION FOR REMOTE DISPENSER TRANSACTIONS in the name of William S. Johnson, Jr.; and application Ser. No. 08/895,225 filed Jul. 16, 1997, entitled PROTOCOL FOR REMOTE DISPENSER TRANSACTIONS in the name of William S. Johnson, Jr. The disclosures of these applications are incorporated herein by reference.

Figure 5A:
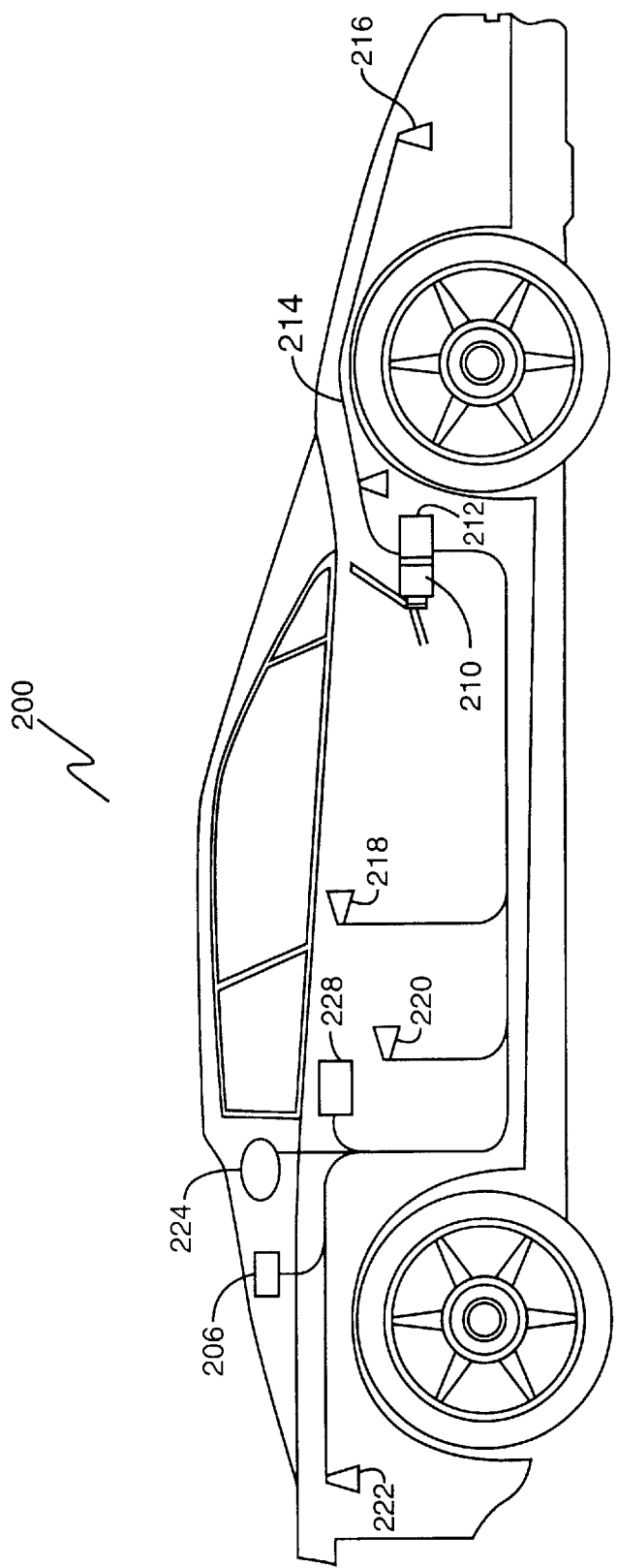
FIG. 5A depicts a vehicle capable of communicating with a fuel dispensing system constructed according to the present invention.

The remote communication electronics 206, 207 of the vehicle 200 or fuel container 209 may simply be a sticker tag or module placed on a part of the vehicle 200 or container 209, capable of providing fuel delivery indicia. The communication electronics are generally in communication with a vehicle controller or system providing the fuel delivery indicia. Any system providing the indicia is acceptable from a dedicated device in or near the fuel tank to a highly intelligent and centralized control system controlling most vehicle functions. In the latter case, a vehicle 200 may be equipped with an intelligent vehicle controller 210 providing interactive multimedia access for the driver and the passengers, as shown in FIG. 5A. The intelligent vehicle controller 210, hereinafter referred to as the IVC, is designed to provide bi-directional access via various communication systems and networks, to systems and people apart from the vehicle 200, such as a fuel dispensing system or a fuel dispenser store. One of the primary purposes of the IVC 210 is to facilitate monitoring, reconfiguration, and transfer of various types of vehicle data, including fuel delivery indicia. Another primary purpose of the IVC 210 is to provide an interactive communication medium allowing customers to interface remote systems to receive advertising and merchandising indicia and, in return, order and provide payment for selected items from within the vehicle 200.

The IVC 210 may be permanently integrated in the vehicle's interior with the electronic system, or be configured to removably interface with the electronic system and remain portable between vehicles. In a portable configuration, an interface or docking station 212 is preferable to couple the IVC 210 to any necessary remote communication electronics 206 and any desired vehicle systems.

The vehicle 200 shown in FIG. 5A is equipped with an IVC 210 coupled to a vehicle mounted docking interface 212. The docking interface 212 preferably is coupled via a bus or wiring network 214 to various vehicle systems and/or sensors 216–222. The IVC 210, either directly or through the docking interface 212 and/or the network 214, will interface with the remote communication electronics 206 to provide communications to and from the vehicle 200. Any necessary antennas are preferably placed near the vehicle's exterior to enable proper communications to and from the proper external system, such as the fuel dispenser 110 (of FIGS. 1 and 2).

The IVC 210 may also directly or indirectly cooperate with the vehicle's fueling system 224, which includes the fuel tank 204 (of FIG. 1). The fueling system 224 may also include any on-board vapor recovery (ORVR) equipment as well as a central vehicle control system 228. In embodiments where the IVC 210 is integrated with the vehicle, the control and communication aspects of the vehicle and the IVC 210 may be integrated into one centralized control system capable of operating a multimedia interface associated with the IVC 210, any remote communication electronics 206, and the remaining vehicle systems, sensors and functions.

The IVC 210 may be configured to communicate via any number of communication systems comprising the remote communication electronics 206. The communication systems may include satellite, cellular or local communication electronics. The global positioning system is exemplary of a satellite system network capable of interfacing with the IVC 210. A cellular interface could be used to provide modem access to any system also interfacing the telephone network. Preferably, the IVC 210 will include local communication electronics to facilitate communications with fuel dispensers 110 (of FIGS. 1 and 2), toll plazas, parking facilities, car washes, restaurants or other service or diagnostic facilities providing substantially direct line of sight communications.

Figure 5B:
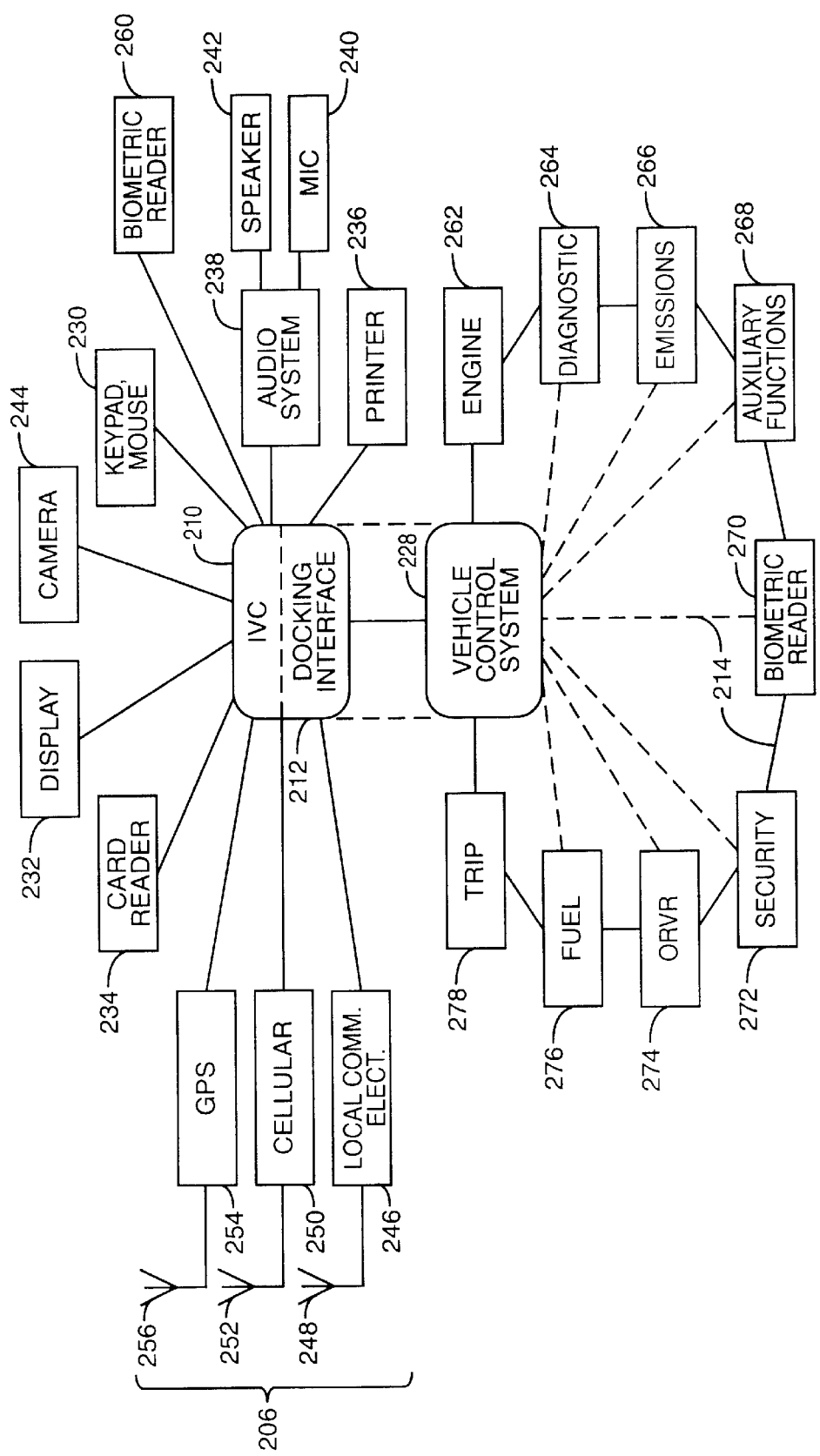
FIG. 5B depicts a block diagram of the vehicle electronics for the vehicle of FIG. 5A.

As shown in FIG. 5B, the IVC 210 may interface or actually be a part of a vehicle control system 228. Thus, the IVC 210 may have separate processing capability or share processing capability with the central vehicle control system, depending on the amount of integration and the configuration of the IVC 210 and vehicle 200. Although the IVC 210 and the vehicle control system 228 may be integrated, the preferred embodiment provides an IVC 210 capable of operating substantially independently of, yet cooperating with, the vehicle control system 228.

The IVC 210 may include the docking interface 212 for coupling to the vehicle control system 228. The IVC 210 may also be associated with an audio system 238, microphone 240, and speaker 242 for providing a bi-directional audio intercom with a corresponding remote system, such as a fuel dispenser 110 (of FIGS. 1 and 2) or a quick-serve restaurant. Additionally, the IVC 210 may be associated with a card reader 234, SmartCard receiver, or biometric reader 260, a user input means, such as a keypad, mouse, or touch screen electronics 230, a video display 232, and a printer 236. These features cooperate to provide a basic multimedia interface and means for paying for items ordered through the IVC 210.

A camera 244 may be provided to receive images of the vehicle's occupants to enhance an audio intercom system with one or two direction video. With such a system, an order entry operator at a quick-serve restaurant and the vehicle occupant would be able to see and hear each other during order placement. For information providing like audio and video intercom interface at a dispenser, attention is drawn to U.S. application Ser. No. 08/659,304 filed Jun. 6, 1996 entitled Fuel Dispenser/Operator Intercom System and the continuation application filed Feb. 10, 1998, the disclosure of which is incorporated herein by reference.

A biometric reader 260 may also be coupled to the IVC 210 to provide additional authorization or identification means for vehicle occupants. The biometric reader 260 may read the occupant's fingerprints, voice print, retinal scan or other biometric indicia to provide a substantially secure authorization. Such authorization or identification is preferably used in cooperation with financial information stored in the IVC 210 or retrieved via the card reader 234. Biometric templates corresponding to the authorized card holder or occupant may be stored on a card read by the card reader, in the IVC 210 remote system or on a network for comparison with the actual biometric indicia provided by the biometric reader 260.

It is also envisioned that the IVC 210 be coupled to or integrated with a Vehicle control system 228 capable of controlling various engine functions 262, diagnostic systems 264, emission systems 266, and any number of auxiliary functions 268 or miscellaneous sensors 270. The control system may also interact with the vehicle security system 272, on-board vapor recovery equipment 274, and trip-related features and functions 278. Further, the control system may interact with fuel status sensors 276 that may be configured to determine whether the vehicle is receiving the proper type of fuel from the dispenser. The IVC 210 and/or vehicle control system 228 will be able to monitor diagnostic or emission systems of the vehicle and communicate related information to the occupants of the vehicle and/or a remote system for further identification or processing of vehicles with diagnostic or emission problems or malfunctions.

For example, during a fueling operation at a fuel station, any fueling, diagnostic, or emission problems may be forwarded through the local communication electronics 246 to a corresponding dispenser interrogator 125 and on to the proper authorities or the fuel station store. Providing such information to the fuel station provides a marketing opportunity for service equipped stations to address or correct any diagnostic or emission problems, as well as a system for endorsing government regulations. Similarly, security breaches, such as theft of the vehicle, may be reported in like manner.

In the preferred embodiment, the local communication electronics 246 of the remote communication electronics 206, or the remote communication electronics 207, transmit fuel delivery indicia or other information relating to the vehicle 200 or fuel container 209 to the interrogator 125 of the dispenser 110. The fuel delivery indicia may generally include information indicative of fuel being received by the vehicle 200 or fuel container 209, or the type of fuel being received. Information indicative of fueling may include volume, ullage, delivery rate information or simply indicate fuel is being received regardless of rate. Any information informing the dispenser or providing the dispenser sufficient information to determine that fuel is being received is acceptable. This information may be gathered or obtained by the vehicle or vehicle device in any manner and by any means, such as a fuel gauge.

The fuel delivery information may also be or include the type of fuel being received. Preferably, the control system 126 of the fuel dispenser 110 is adapted to receive the fuel delivery indicia from the vehicle 200 or fuel container 209 via the dispenser interrogator 125. In the preferred embodiment, the local communications method between the remote communication electronics 206, 207 and the dispenser interrogator 125 includes radio frequencies in the microwave range. However, any type of communication link is acceptable including other RF, infrared, acoustic, or other known remote communication methods for use in a fueling environment. In addition, the fuel delivery indicia from the vehicle 200 or fuel container 209, discussed above, may be transferred via the central controller 300.

For those vehicles equipped with on-board vapor recovery (ORVR) equipment, the status, type, efficiency and other related ORVR information may be communicated to the dispenser's vapor system in order to control vapor recovery at the dispenser and/or vehicle to maximize the vapor recovery effort while minimizing ingestion of non-hydrocarbon saturated air into the underground fuel tanks. For additional information relating to communications between the vehicle and a dispenser or dispensing system, attention is directed to U.S. patent application Ser. No. 08/650,917 Filed May 17, 1996 entitled Precision Fuel Dispenser; Ser. No. 08/649,455 filed May 17, 1996 entitled Onboard Vapor Recovery Detection; Ser. No. 08/759,733 filed Dec. 6, 1996 entitled Intelligent Fueling; Ser. No. 09/094,999 filed Jun. 15, 1998 entitled Transponder Communication of ORVR Presence; Ser. No. 09/034,969 filed Mar. 4, 1998 entitled Multistage Ordering System for a Fueling and Retail Environment; and Ser. No. 09/024,742 filed Feb. 17, 1998 entitled Fuel Dispensing System Providing Customer Preferences. The disclosures of these references are incorporated herein by reference.

Figure 5C:
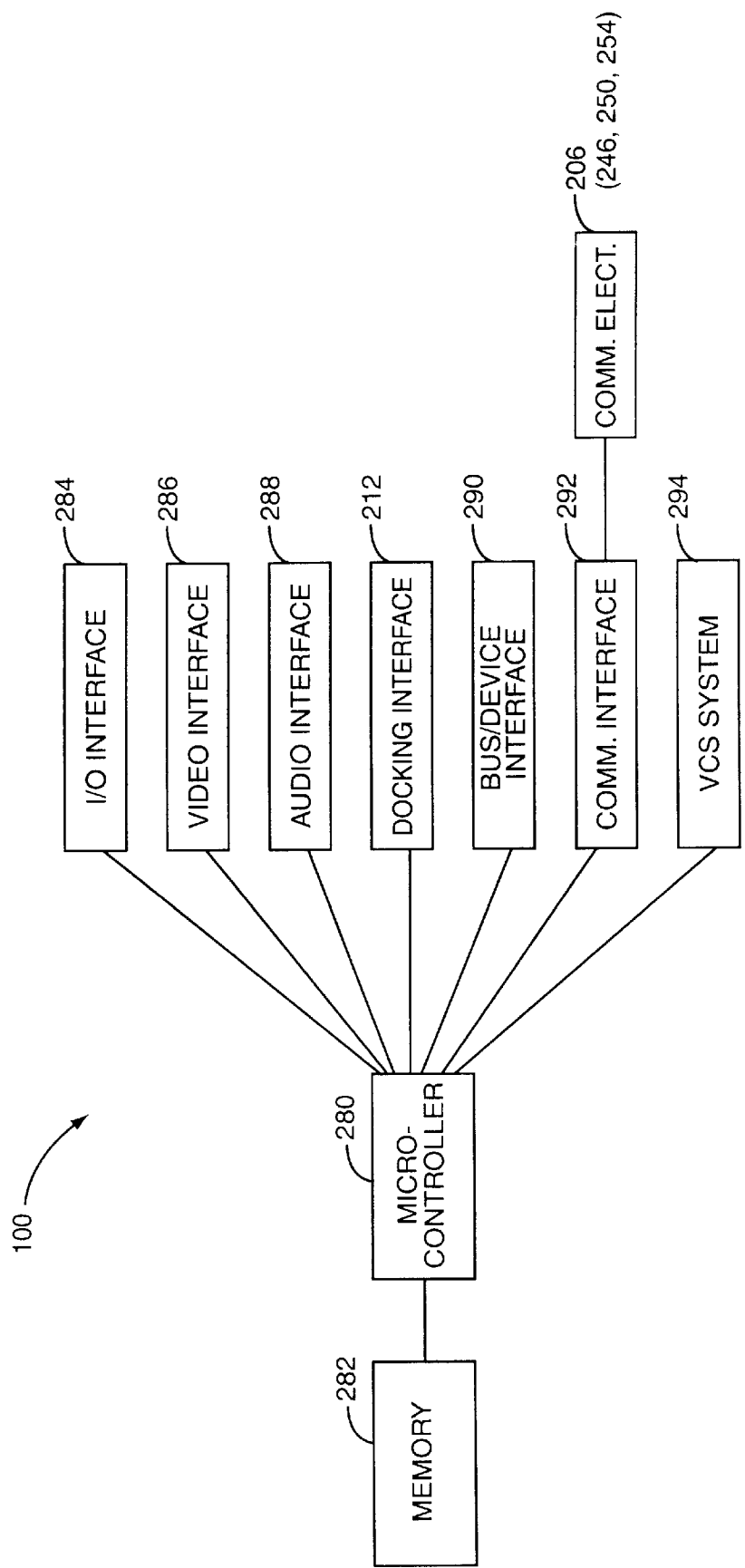
FIG. 5C depicts a block diagram of an intelligent vehicle controller.

With respect to FIG. 5C, the IVC preferably includes a microcontroller 280 and associated memory 282. The microcontroller and memory 280, 282 either include or are associated with various interfaces. These interfaces include multiple input/output interfaces 284 for receiving and transmitting data to the various vehicle subsystems, and a video interface 286 for receiving and transmitting video from the display 232 and camera 244. The docking interface 212, as described, provides a coupling to the vehicle control system 228 or bus or network system 214. A network bus or device interface 290 is provided to interface with a standard vehicle bus wherein various vehicle subsystems, including the vehicle control system 228, are coupled to the same bus wherein each system is adapted to communicate with other systems as necessary to provide overall system functionality. The IVC also includes a communication interface 292 as well as an optional direct vehicle control system interface 294.

As those of ordinary skill in the art will recognize, there are a number of hardware configurations capable of providing the functionality described in association with the intelligent vehicle controller. The IVC provides an integrated or portable user interface for vehicle occupants to communicate with systems remote to the vehicle such as the fuel dispenser 110. The IVC provides full function audio, video and graphics, as well as means to receive occupant input, transactional information and vehicle identification. The IVC and other vehicle systems are configured to provide information transfer relating to both the vehicle and occupants while providing a secure, merchandising and order entry system within the vehicle.

Figure 6A:
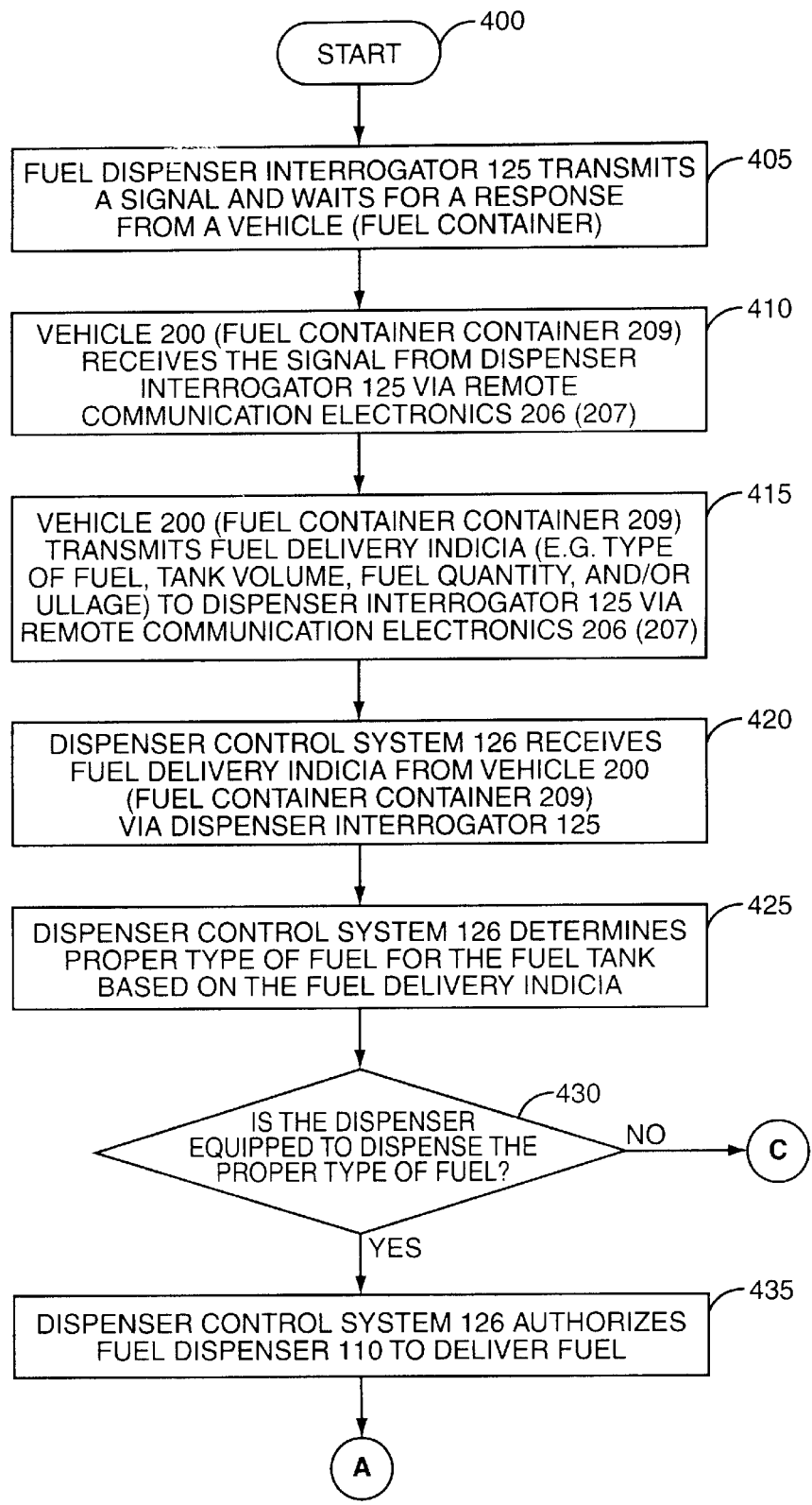
FIGS. 6A–6C are a flow chart of the process of a fuel dispensing system that prevents unauthorized fueling according to a first embodiment of the present invention.
Figure 6B:
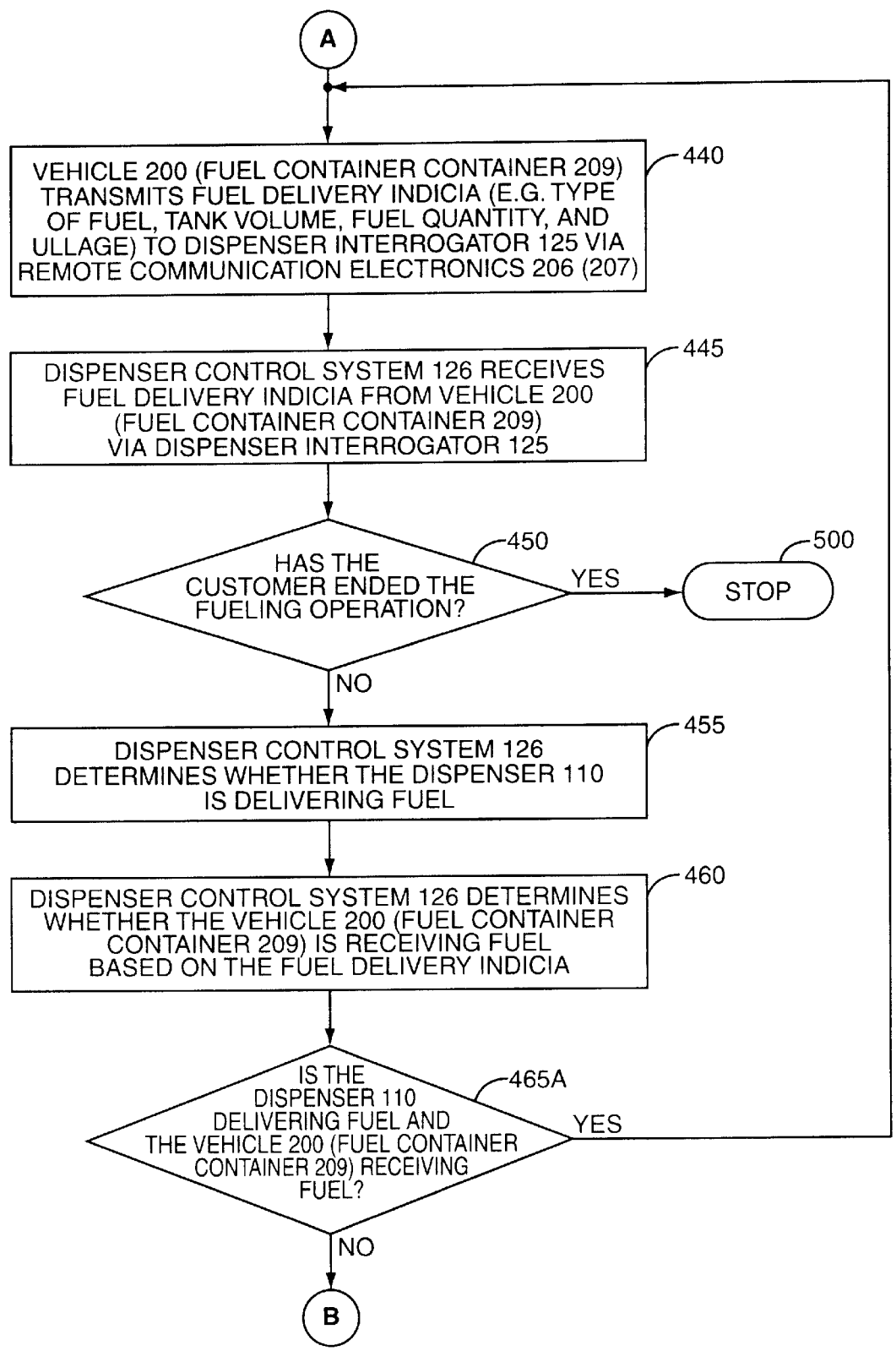
Figure 6C:
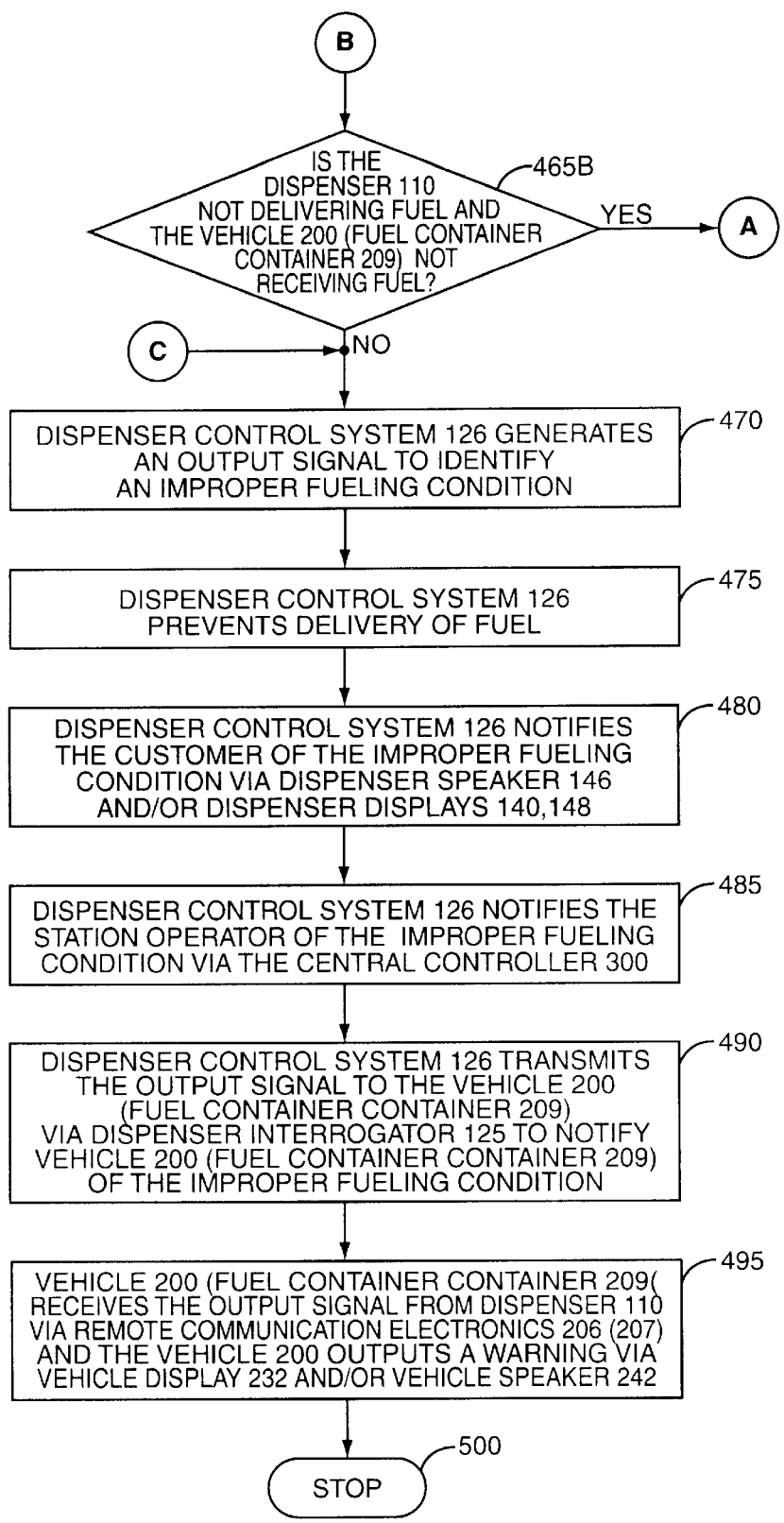

FIGS. 6A–6C depict the basic flow of a fuel dispensing system that prevents unauthorized fueling, according to a first embodiment of the present invention wherein the control system monitors for an indication of receiving fuel by the vehicle 200 or fuel container 209, and delivery of fuel by the dispenser 110. The process begins (block 400) when the interrogator 125 of the fuel dispenser 110 transmits a signal into the fueling environment 100 and waits for a response from a vehicle (block 405). When a customer drives a vehicle 200 up to the fuel dispenser 110, the vehicle 200 receives the signal from the dispenser interrogator 125 via the vehicle's remote communication electronics 206 (block 410). The vehicle 200 then transmits the fuel delivery indicia back to the dispenser interrogator 125 via the vehicle's remote communication electronics 206 (block 415).

The dispenser control system 126 receives the fuel delivery indicia via the dispenser interrogator 125 (block 420) and uses the information to determine the type of fuel the vehicle is authorized to receive (block 425). The dispenser control system 126 then determines whether the dispenser 110 is equipped to dispense the proper type of fuel for the vehicle 200 (block 430).

If the dispenser 110 is not equipped to deliver the proper type of fuel, the dispenser control system 126 generates an output signal (block 470) that identifies an improper fueling condition. The dispenser control system 126 may then prevent the dispenser 110 from delivering fuel (block 475) and notify the customer of the improper fueling condition via the dispenser speaker 146 and/or the dispenser displays 140, 148 (block 480). The dispenser control 126 system may also notify the station operator of the improper fueling condition via the central controller 300 (block 485). Further, the dispenser control system 126 may transmit the output signal to the vehicle 200 via the dispenser interrogator 125 to notify the vehicle 200 of the improper fueling condition (block 490). The vehicle 200 may receive the output signal from the dispenser 110 via the remote communication electronics 206, and output a warning through the vehicle display 232 and/or the vehicle speaker 242 (block 495). The process then stops (block 500).

On the other hand, if the control system 126 determines that the dispenser 110 is equipped to dispense the proper type of fuel for the vehicle 200 (block 430), the control system 126 authorizes the fuel dispenser 110 to deliver fuel (block 435). At this time, the customer may begin fueling the vehicle 200.

Once fuel delivery is authorized and the customer actually begins fueling, the vehicle 200 may periodically or continuously transmit fuel delivery indicia to the dispenser interrogator 125 via the vehicle's remote communication electronics 206 (block 440), independently or in response to polling by the interrogator. Accordingly, the dispenser control system 126 receives the fuel delivery indicia from the vehicle 200 via dispenser interrogator 125 (block 445).

At this point, the dispenser control system 126 determines whether the customer has ended the fueling operation, such as by placing the nozzle 104 back onto the dispenser 110 (block 450). If the customer has ended the fueling operation, the process stops (block 500).

If the customer has not ended the fueling operation, the dispenser control system 126 determines whether the dispenser 126 is actually delivering fuel (block 455) by checking the fuel delivery hardware, such as meter or pump equipment, or seeing if fuel delivery remains authorized. The dispenser control system then determines whether the vehicle 200 is actually receiving fuel based on the fuel delivery indicia (block 460). If the dispenser control system 126 determines that the dispenser 110 is delivering fuel and the vehicle 200 indicates that it is receiving fuel (block 465A), the control system 126 maintains fuel delivery authorization and the vehicle 200 transmits the new fuel delivery indicia to the dispenser interrogator 125 (block 440). This provides a strong indication that the dispenser 110 is dispensing fuel to the authorized tank in the vehicle 200.

In addition, if the dispenser control system determines that the dispenser 110 is not delivering fuel, and the vehicle 200 indicates that it is not receiving fuel (block 465B), the control system maintains fuel delivery authorization and the vehicle 200 transmits the new fuel delivery indicia to the dispenser interrogator 125 (block 440). This is an indication that the customer has stopped fueling or is "topping off", by squeezing and releasing the nozzle in short increments.

The dispenser control system 126 may generate an output signal to identify an improper fueling condition (block 470) if the dispenser 110 determines that it is delivering fuel, but the vehicle 200 indicates that it is not receiving fuel. An improper fueling condition is also detected if dispenser 110 determines that it is not delivering fuel, but the vehicle 200 indicates that it is receiving fuel. In either case, once the improper fueling condition is detected, the dispenser control system 126 may prevent the dispenser from delivering fuel (block 475) and notify the customer of the improper fueling condition via the dispenser speaker 146 and/or the dispenser displays 140, 148 (block 480). The dispenser control system may also notify the station operator of the improper fueling condition via the central controller 300 (block is 485). Further, the dispenser control system 126 may transmit the output signal to the vehicle 200 via the dispenser interrogator 125 to notify the vehicle 200 of the improper fueling condition (block 490). The vehicle 200 may in turn receive the output signal from the dispenser 110 via the remote communication electronics 206, and output a warning through the vehicle display 232 and/or the vehicle speaker 242 (block 495). The process then stops (block 500).

Figure 7A:
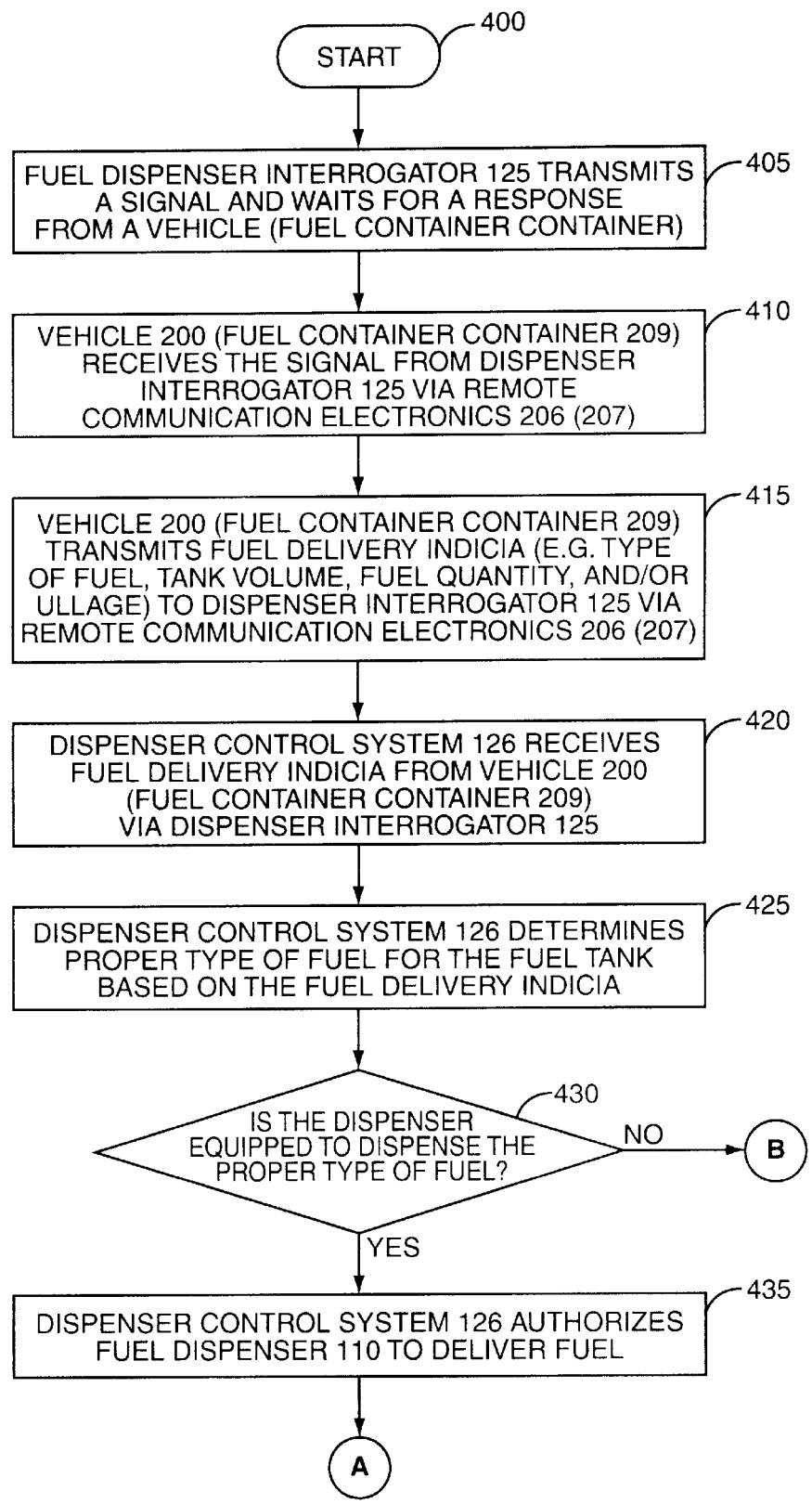
FIGS. 7A–7C are a flow chart of the process of a fuel dispensing system that prevents unauthorized fueling according to a second embodiment of the present invention.
Figure 7B:
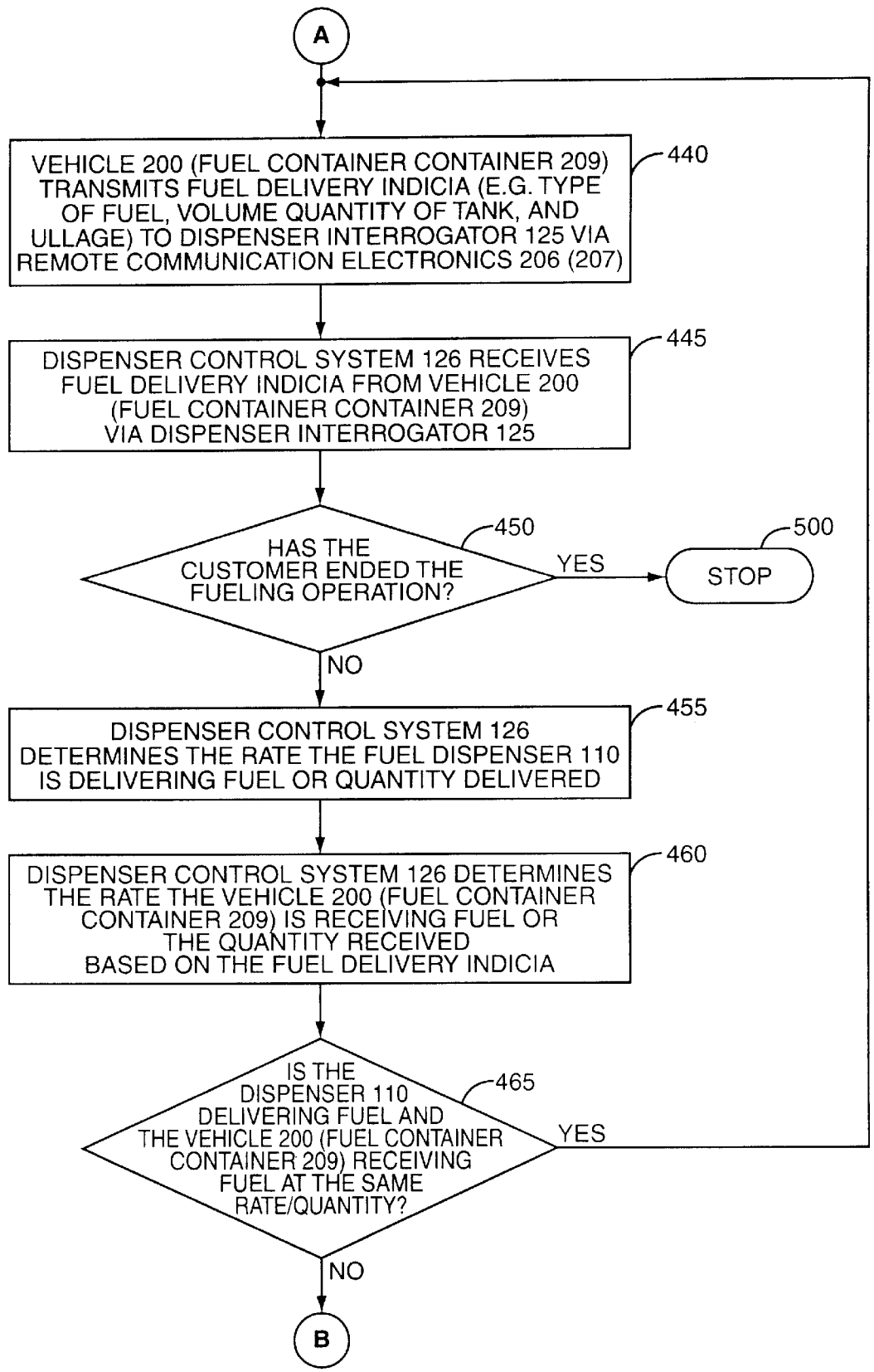
Figure 7C:
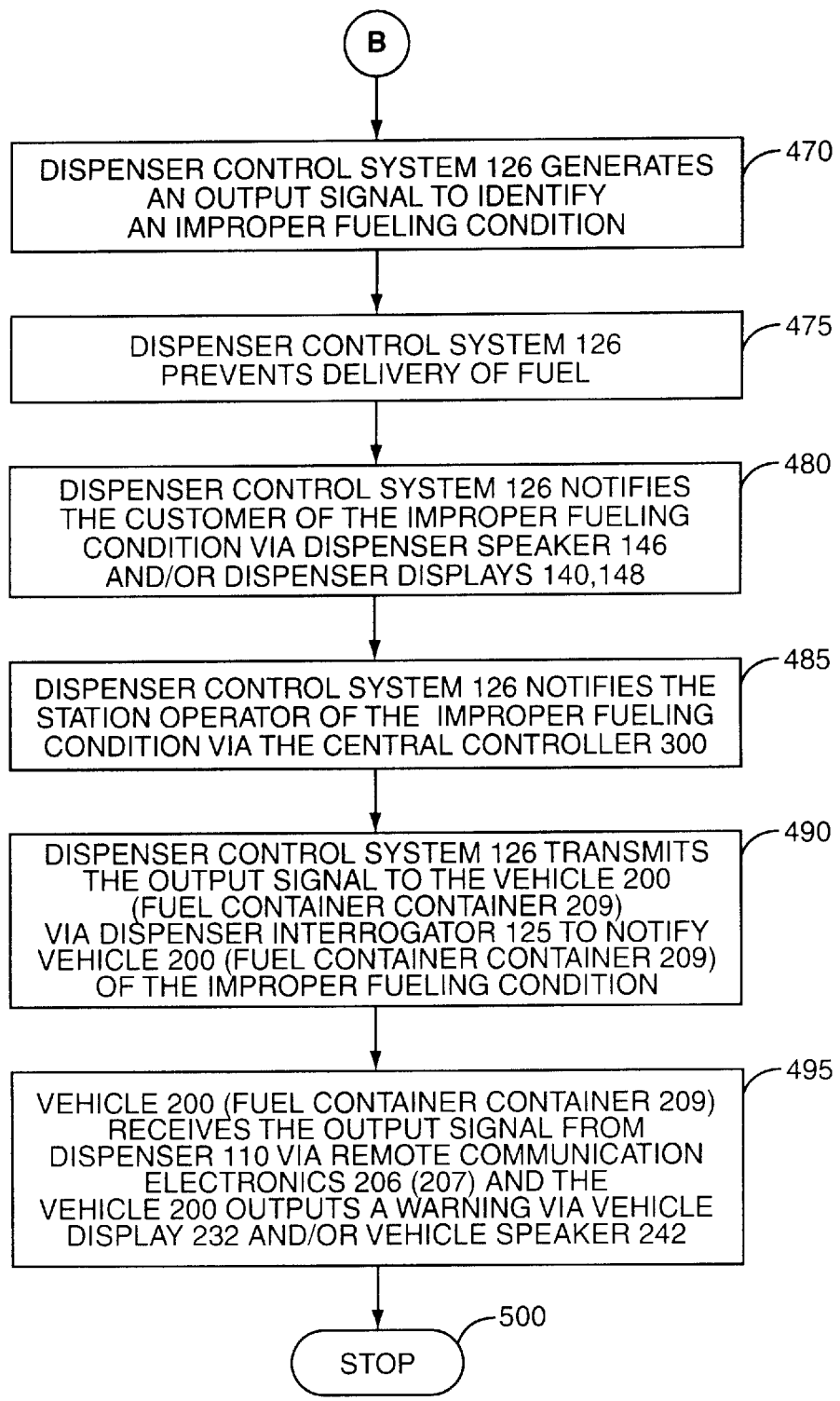

FIGS. 7A–7C depict the basic flow of a fuel dispensing system that prevents unauthorized fueling, according to a second embodiment of the present invention wherein the control system monitors for an indication that fuel is being delivered and received in a certain quantity or at a certain rate. The process begins (block 400) when the interrogator 125 of the fuel dispenser 110 transmits a signal into the fueling environment 100 and waits for a response from a vehicle (block 405). When a customer drives a vehicle 200 up to the fuel dispenser 110, the vehicle 200 receives the signal from the dispenser interrogator 125 via the vehicle's remote communication electronics 206 (block 410). The vehicle 200 then transmits the fuel delivery indicia, as discussed above, back to the dispenser interrogator 125 via the vehicle's remote communication electronics 206 (block 415) as well.

The dispenser control system 126 receives the fuel delivery indicia via the dispenser interrogator 125 (block 420) and uses the information to determine the type of fuel the vehicle is authorized to receive (block 425). The dispenser control system 126 then determines whether the dispenser 110 is equipped to dispense the proper type of fuel for the vehicle 200 (block 430).

If the dispenser 110 is not equipped to deliver the proper type of fuel, the dispenser control system 126 may generate an output signal (block 470) that identifies an improper fueling condition. The dispenser control system 126 may then prevent the dispenser 110 from delivering fuel (block 475) and notify the customer of the improper fueling condition via the dispenser speaker 146 and/or the dispenser displays 140, 148 (block 480). The dispenser control system 126 may also notify the station operator of the improper fueling condition via the central controller 300 (block 485). Further, the dispenser control system 126 transmits the output signal to the vehicle 200 via the dispenser interrogator 125 to notify the vehicle 200 of the improper fueling condition (block 490). The vehicle 200 may receive the output signal from the dispenser 110 via the remote communication electronics 206, and output a warning through the vehicle display 232 and/or the vehicle speaker 242 (block 495). The process then stops (block 500).

On the other hand, if the control system 126 determines that the dispenser 110 is equipped to dispense the proper type of fuel for the vehicle 200 (block 430), the control system 126 may authorize the fuel dispenser 110 to deliver fuel (block 435). At this time, the customer may begin fueling the vehicle 200.

Once fuel delivery is authorized and the customer begins fueling, the vehicle 200 may transmit fuel delivery indicia to the dispenser interrogator 125 via the vehicle's remote communication electronics 206 (block 440). Accordingly, the dispenser control system receives the fuel delivery indicia from the vehicle 200 via the dispenser interrogator 125 (block 445).

At this point, the dispenser control system 126 determines whether the customer has ended the fueling operation by placing the nozzle 104 back onto the dispenser 110 (block 450). If the customer has ended the fueling operation, the process stops (block 500).

On the other hand, if the customer has not ended the fueling operation, the dispenser control system 126 may determine the quantity of fuel the dispenser 110 has delivered or the rate the dispenser 126 is delivering fuel (block 455). The dispenser control system 126 may further determine the quantity of fuel the vehicle 200 has received, or the rate the vehicle 200 is receiving fuel, based on the fuel delivery indicia (block 460). The fuel delivery indicia transmitted from the vehicle 200 may relate to the volume of fuel in the vehicle's fuel tank. In this case, the control system 126 may be configured to determine the quantity of fuel received by the vehicle 200 by calculating the difference in volume of fuel in the tank between two transmissions of fuel delivery indicia from the vehicle 200. The fuel delivery indicia may also relate to a difference in volume of fuel in the vehicle's fuel tank between two transmissions of fuel delivery indicia. In that case, the control system 126 may be configured to determine the quantity of fuel received by the vehicle 200, simply based on the fuel delivery indicia. In either case, the control system 126 may be further configured to determine the rate the vehicle is receiving fuel by dividing the quantity of fuel received by the vehicle, by the time elapsed between the volume measurements.

If the dispenser control system 126 determines that the dispenser 110 has delivered a certain quantity of fuel and the vehicle 200 has received the same quantity of fuel, the control system 126 may maintain fuel delivery authorization. Similarly, if the control system 126 determines that the dispenser 110 is delivering fuel at a certain rate and the vehicle 200 is receiving fuel at the same rate, the control system 126 may maintain fuel delivery authorization. The vehicle 200 then transmits the new fuel delivery indicia to the dispenser interrogator 125 (block 440) wherein the process repeats until fueling ends or an improper fueling condition is detected.

If the control system 126 determines that the dispenser 110 has delivered a certain quantity of fuel and the vehicle 200 has received a different quantity of fuel, the control system 126 may generate an output signal to identify an improper fueling condition (block 470). Likewise, the control system 126 may generate an output signal if it determines that the dispenser 110 is delivering fuel at one rate and the vehicle 200 is receiving fuel at a different rate. There is an indication that there may be a leak in the tank of the vehicle if the vehicle 200 has received less fuel than the dispenser 110 has delivered. Thus, the dispenser control system 126 may prevent the dispenser from delivering fuel (block 475) and notify the customer of the improper fueling condition via the dispenser speaker 146 and/or the dispenser displays 140, 148 (block 480). The dispenser control 126 system may also notify the station operator of the improper fueling condition via the central controller 300 (block 485). Further, the dispenser control system 126 may transmit the output signal to the vehicle 200 via the dispenser interrogator 125 to notify the vehicle 200 of the improper fueling condition (block 490). The vehicle 200 may receive the output signal from the dispenser 110 via the remote communication electronics 206, and output a warning through the vehicle display 232 and/or the vehicle speaker 242 (block 495). The process then stops (block 500).

Figure 8A:
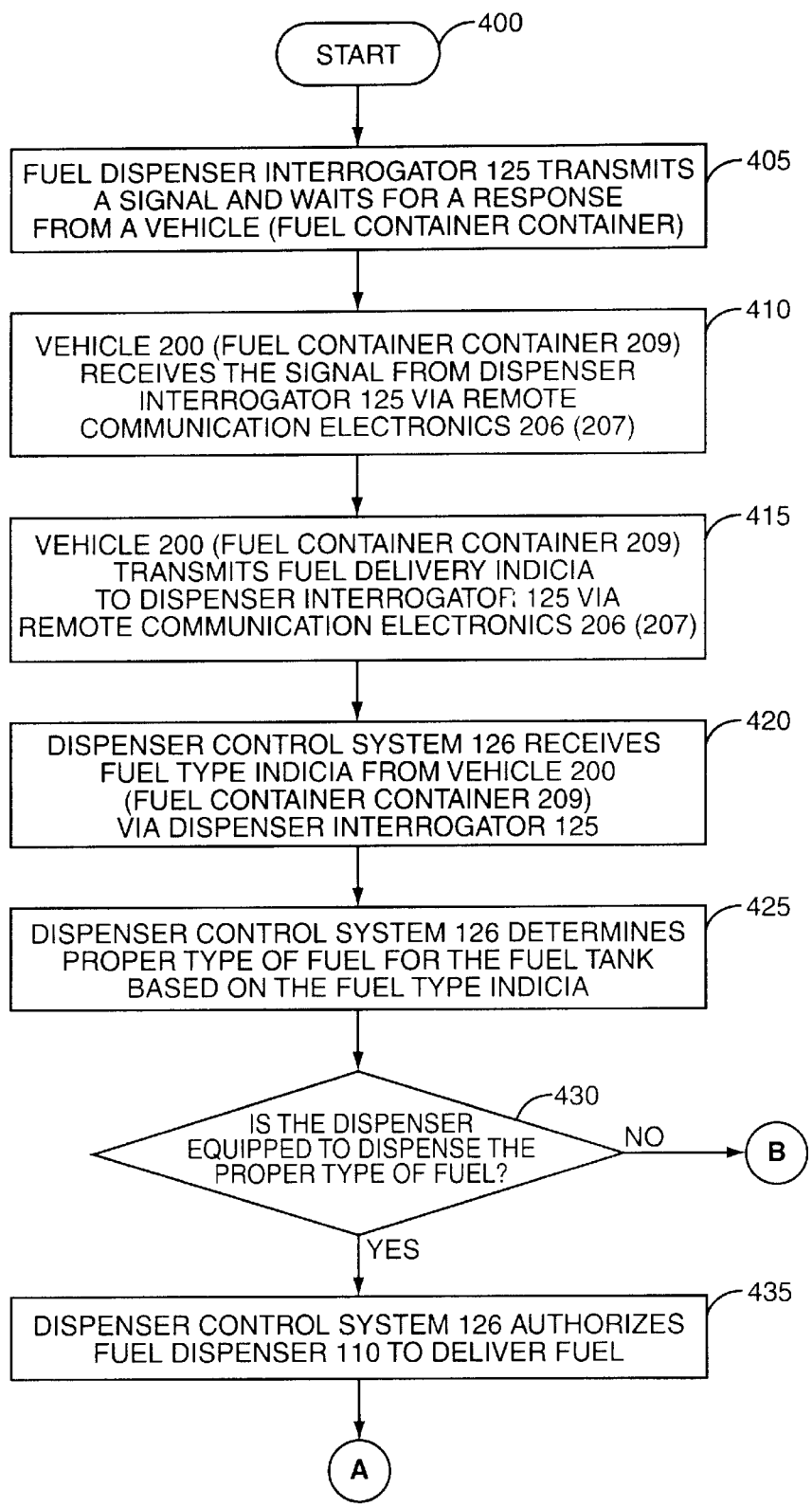
FIGS. 8A–8B are a flow chart of the process of a fuel dispensing system that prevents unauthorized fueling according to a third embodiment of the present invention.
Figure 8B:
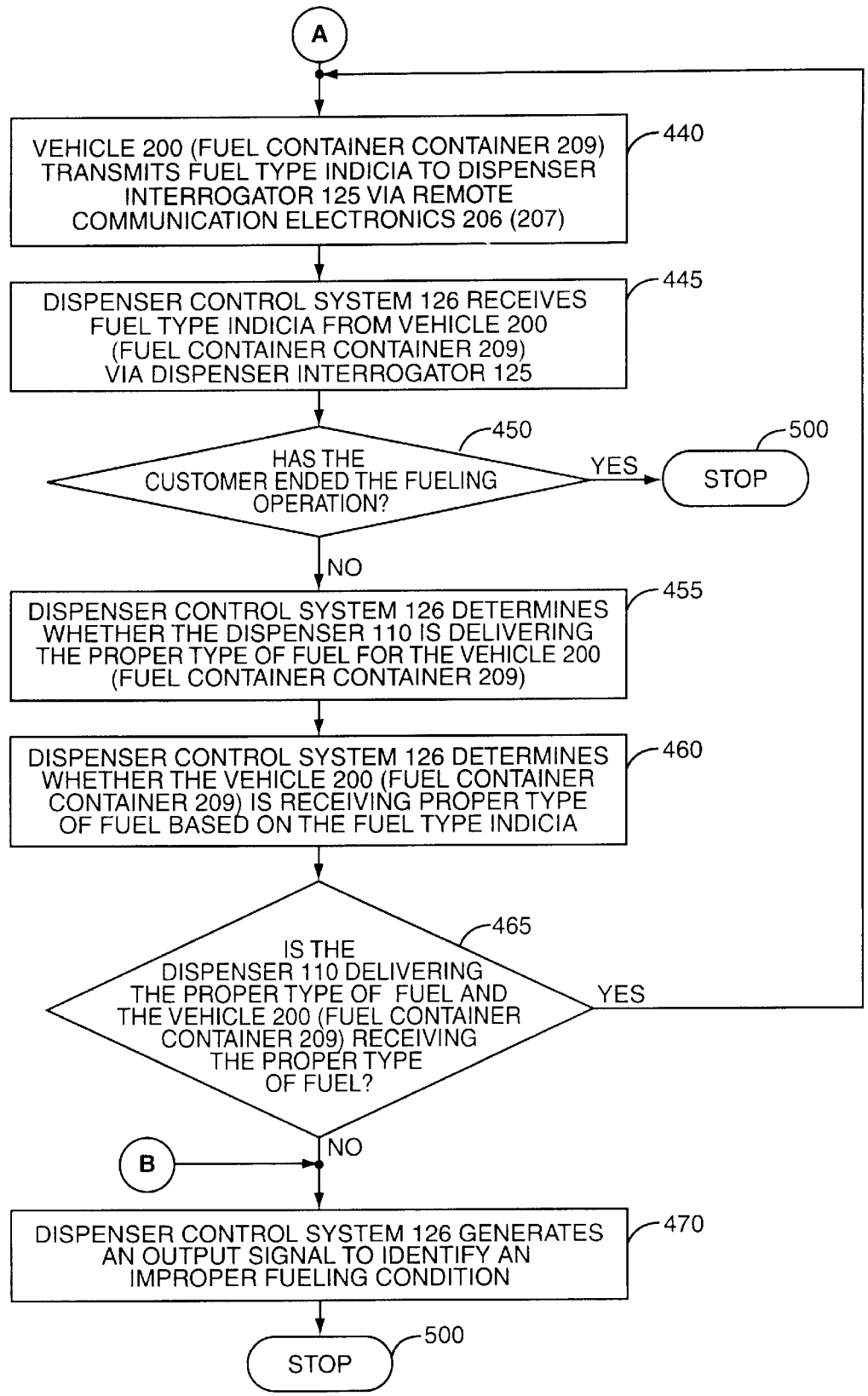

FIGS. 8A–8B depict the basic flow of a fuel dispensing system that prevents unauthorized fueling, according to a third embodiment of the present invention. The process begins (block 400) when the interrogator 125 of the fuel dispenser 110 transmits a signal into the fueling environment 100 and waits for a response from a vehicle (block 405). When a customer drives a vehicle 200 up to the fuel dispenser 110, the vehicle 200 receives the signal from the dispenser interrogator 125 via the vehicle's remote communication electronics 206 (block 410). The vehicle 200 then transmits the fuel delivery indicia relating to the fuel type back to the dispenser interrogator 125 via the vehicle's remote communication electronics 206 (block 415).

The dispenser control system 126 receives the fuel type indicia via the dispenser interrogator 125 (block 420) to determine the type of fuel the vehicle is authorized to receive (block 425). The dispenser control system 126 may then determine whether the dispenser 110 is equipped to dispense the proper type of fuel for the vehicle 200 (block 430).

If the dispenser 110 is not equipped to deliver the proper type of fuel, the dispenser control system 126 may generate an output signal (block 470) that identifies an improper fueling condition. The dispenser control system may then prevent the dispenser 110 from delivering fuel and notifies the customer, station operator, and vehicle of the improper fueling condition, as discussed above regarding FIGS. 5A–5C and 6A–6C. The process then stops (block 500).

On the other hand, if the control system 126 determines that the dispenser 110 is equipped to dispense the proper type of fuel for the vehicle 200 (block 430), the control system 126 authorizes the fuel dispenser 110 to deliver fuel (block 435). At this time, the customer may begin fueling the vehicle 200.

Once fuel delivery is authorized and the customer begins fueling, the vehicle 200 may transmit the fuel type indicia to the dispenser interrogator 125 via the vehicle's remote communication electronics 206 (block 440). Accordingly, the dispenser control system receives the fuel type indicia from the vehicle 200 via the dispenser interrogator 125 (block 445).

At this point, the dispenser control system 126 may determine whether the customer has ended the fueling operation by placing the nozzle 104 back onto the dispenser 110 (block 450). If the customer has ended the fueling operation, the process stops (block 500).

On the other hand, if the customer has not ended the fueling operation, the dispenser control system 126 determines whether the dispenser is delivering the proper type of fuel for the vehicle 200 (block 455). The dispenser control system then determines whether the vehicle is receiving the proper type of fuel, based on the fuel type indicia (block 460) gathered from fuel type sensors 276 (of FIG. 5B) configured to determine fuel type or characteristics of fuel delivered to the vehicle. Those skilled in the are aware of various hydrocarbon and related sensors.

If the dispenser control system 126 determines that the dispenser 110 is delivering the proper type of fuel and the vehicle 200 is receiving the proper type of fuel, the control system 126 maintains fuel delivery authorization. The vehicle 200 may then transmit the fuel type indicia to the dispenser interrogator 125 again (block 440) wherein the process repeats.

However, if the control system 126 determines that the dispenser 110 is not delivering the proper type of fuel and the vehicle is not receiving the proper type of fuel, the control system 126 may generate an output signal to identify an improper fueling condition (block 470). Thus, the dispenser control system 126 may prevent the dispenser from delivering fuel and notify the customer, station operator, and/or vehicle of the improper fueling condition, discussed above regarding FIGS. 5A–5C and 6A–6C. The process then stops (block 500).

In each of the preferred embodiments discussed herein, the vehicle 200 and remote communications device 206 may be replaced with a fuel container 209 with remote communication device 207.

Certain modifications and improvements will occur to those skilled in the art upon reading the foregoing description. For example, the control system of the claims may be the dispenser control system or central control, alone or in combination. The place of control is not as important as the actual control. It should be understood that all such modifications and improvements have been omitted for the sake of conciseness and readability, but are properly within the scope of the following claims.

What is claimed is:

1. A fuel delivery system for preventing unauthorized fueling comprising:
   a. a fuel dispenser adapted to deliver fuel to a vehicle configured to provide a signal including fuel delivery indicia to said fuel dispenser;
   b. communication electronics associated with said fuel dispenser, said communication electronics adapted to receive the signal provided by the vehicle that comprises fuel delivery indicia indicative of actual fuel delivery to the vehicle; and
   c. a control system associated with said fuel dispenser and said communication electronics, said control system adapted to:
      i. receive the fuel delivery indicia from the vehicle via said communication electronics;
      ii. determine if fuel is being delivered from said fuel dispenser;
      iii. determine if fuel is being received by the vehicle based on the fuel delivery indicia; and
      iv. allow fuel delivery if fuel is being delivered from said fuel dispenser and fuel is being received by the vehicle.

2. The fuel delivery system for preventing unauthorized fueling of claim 1, wherein said control system is further adapted to:
   a. determine a rate of delivery of fuel from said fuel dispenser;
   b. determine a rate of receipt of fuel by the vehicle based on the fuel delivery indicia; and
   c. allow fuel delivery if the rate of delivery of fuel from said fuel dispenser is equal to the rate of receipt of fuel by the vehicle.

3. The fuel delivery system for preventing unauthorized fueling of claim 2, wherein the fuel delivery indicia relates to a volume of fuel in a fuel tank associated with the vehicle, and said control system is adapted to determine:
   a. a quantity of fuel received by the vehicle by calculating a difference in the volume of fuel in the fuel tank between two transmissions of the fuel delivery indicia from the vehicle; and
   b. the rate of receipt of fuel by the vehicle by dividing the quantity of fuel received by the vehicle, by the time elapsed between volume measurements.

4. The fuel delivery system for preventing unauthorized fueling of claim 2, wherein the fuel delivery indicia relates to a difference in volume of fuel in a fuel tank associated with the vehicle between two transmissions of the fuel delivery indicia from the vehicle and said control system is adapted to determine:
   a. a quantity of fuel received by the vehicle based on the fuel delivery indicia; and
   b. the rate of receipt of fuel by the vehicle by dividing the quantity of fuel received by the vehicle, by the time elapsed between volume measurements.

5. The fuel delivery system for preventing unauthorized fueling of claim 2, wherein said control system is further adapted to detect an improper fueling condition and generate an output signal if the rate of delivery of fuel from said fuel dispenser is not equal to the rate of receipt of fuel by the vehicle.

6. A fuel delivery system for preventing unauthorized fueling comprising:
   a. a fuel dispenser adapted to deliver fuel to a vehicle configured to provide a signal including fuel delivery indicia to said fuel dispenser;
   b. communication electronics associated with said fuel dispenser, said communication electronics adapted to receive the signal provided by the vehicle including fuel delivery indicia sufficient to provide or allow determination of rate of delivery; and
   c. a control system associated with said fuel dispenser and said communication electronics, said control system adapted to:
      i. receive the fuel delivery indicia from the vehicle via said communication electronics;
      ii. determine a rate of delivery of fuel from said fuel dispenser;
      iii. determine a rate of receipt of fuel by the vehicle based on the fuel delivery indicia; and
      iv. allow fuel delivery if the rate of delivery of fuel from said fuel dispenser is equal to the rate of receipt of fuel by the vehicle.

7. A fuel delivery system for preventing unauthorized fueling comprising:
   a. a fuel dispenser adapted to deliver fuel to a fuel container configured to provide a signal including fuel delivery indicia to said fuel dispenser;
   b. communication electronics associated with said fuel dispenser, said communication electronics adapted to receive the signal provided by the fuel container that comprises fuel delivery indicia indicative of actual fuel delivery to the vehicle; and
   c. a control system associated with said fuel dispenser and said communication electronics, said control system adapted to:
      i. receive the fuel delivery indicia from the fuel container via said communication electronics;
      ii. determine if fuel is being delivered from said fuel dispenser;
      iii. determine if fuel is being received by the fuel container based on the fuel delivery indicia; and
      iv. allow fuel delivery if fuel is being delivered from said fuel dispenser and fuel is being received by the fuel container.

8. The fuel delivery system for preventing unauthorized fueling of claim 7, wherein said control system is further adapted to:
   a. determine a rate of delivery of fuel from said fuel dispenser;
   b. determine a rate of receipt of fuel by the fuel container based on the fuel delivery indicia; and
   c. allow fuel delivery if the rate of delivery of fuel from said fuel dispenser is equal to the rate of receipt of fuel by the fuel container.

9. A method for preventing unauthorized fueling in a fuel dispensing system comprising:
   a. providing a fuel dispenser having a receiver adapted to receive a signal including fuel delivery indicia from a vehicle;
   b. receiving the signal that comprises fuel delivery indicia from the vehicle on a continuous basis indicative of actual fuel delivery to the vehicle;

c. determining if fuel is being delivered from said fuel dispenser;

d. determining if fuel is being received by the vehicle based on the fuel delivery indicia; and e. allowing fuel delivery if fuel is being delivered from said fuel dispenser and fuel is being received by the vehicle.

10. The method for preventing unauthorized fueling in a fuel dispensing system of claim 9, further comprising detecting an improper fueling condition and generating an output signal if fuel is being delivered from said fuel dispenser and fuel is not being received the vehicle.

11. The method for preventing unauthorized fueling in a fuel dispensing system of claim 10, further comprising providing a human perceptible warning.

12. The method for preventing unauthorized fueling in a fuel dispensing system of claim 9, wherein:

a. the first determining step includes determining a rate of delivery of fuel from said fuel dispenser;

b. the second determining step includes determining a rate of receipt of fuel by the vehicle based on the fuel delivery indicia; and c. the allowing step includes allowing fuel delivery if the rate of delivery of fuel from said fuel dispenser is equal to the rate of receipt of fuel by the vehicle.

13. The method for preventing unauthorized fueling in a fuel dispensing system of claim 17, further comprising detecting an improper fueling condition and generating an output signal if the rate of delivery of fuel from said fuel dispenser is not equal to the rate of receipt of fuel by the vehicle.

14. A fuel delivery system for preventing unauthorized fueling comprising:

a. fuel dispensing means having a receiver adapted to receive a signal including fuel delivery indicia from a vehicle;

b. means for receiving the signal including fuel delivery indicia from the vehicle on a continuous basis;

c. means for determining if:
   i. fuel is being delivered from said fuel dispensing means; and
   ii. fuel is being received by the vehicle based on the fuel delivery indicia;

d. means for allowing fuel delivery if fuel is being delivered from said fuel dispensing means and fuel is being received by the vehicle;

e. said means for determining further determines:
   i. a rate of delivery of fuel from said fuel dispensing means;
   ii. rate of receipt of fuel by the vehicle based on the fuel delivery indicia; and f. said means for allowing fuel delivery if the rate of delivery of fuel from said fuel dispensing means is equal to the rate of receipt of fuel by the vehicle.

15. The fuel delivery system for preventing unauthorized fueling of claim 14, wherein the fuel delivery indicia relates to a volume of fuel in a fuel tank associated with the vehicle, and wherein said means for determining:

a. a quantity of fuel received by the vehicle by calculating a difference in the volume of fuel in the fuel tank between two transmissions of the fuel delivery indicia from the vehicle; and b. the rate of receipt of fuel by the vehicle by dividing the quantity of fuel received by the vehicle by the time elapsed between volume measurements.

16. The fuel delivery system for preventing unauthorized fueling of claim 14, wherein the fuel delivery indicia relates to a change in volume of fuel in a fuel tank associated with the vehicle between two transmissions of the fuel delivery indicia from the vehicle, and said means for determining:

a. a quantity of fuel received by the vehicle based on the fuel delivery indicia; and b. the rate of receipt of fuel by the vehicle by dividing the quantity of fuel received by the vehicle, by the time elapsed between volume measurements.

17. The fuel delivery system for preventing unauthorized fueling of claim 14, further comprising means for detecting an improper fueling condition and generating an output signal if the rate of delivery of fuel from said fuel dispensing means is not equal to the rate of receipt of fuel by the vehicle.

* * * * *